United States Patent [19]

Ishigaki et al.

[11] Patent Number: 5,301,206
[45] Date of Patent: Apr. 5, 1994

[54] SPREAD SPECTRUM COMMUNICATION SYSTEM

[75] Inventors: Yukinobu Ishigaki, Miura; Takahisa Matsumoto, Yokohama, both of Japan

[73] Assignee: Victor Company of Japan, Inc., Yokohama, Japan

[21] Appl. No.: 13,728

[22] Filed: Feb. 4, 1993

[30] Foreign Application Priority Data

| Feb. 7, 1992 [JP] | Japan | 4-056923 |
|---|---|---|
| Mar. 6, 1992 [JP] | Japan | 4-084632 |
| Apr. 28, 1992 [JP] | Japan | 4-136004 |

[51] Int. Cl.⁵ .......................................... H04B 7/216
[52] U.S. Cl. ............................................... 375/1
[58] Field of Search ...................................... 375/1

[56] References Cited

U.S. PATENT DOCUMENTS

| 4,255,810 | 3/1981 | Soloman et al. | 375/1 |
| 5,073,898 | 12/1991 | Endo et al. | 375/1 |
| 5,121,407 | 6/1992 | Partyka et al. | 375/1 |
| 5,140,610 | 8/1992 | Holliday et al. | 375/1 |
| 5,222,075 | 6/1993 | Richley | 375/1 |

OTHER PUBLICATIONS

"Latest Spread Spectrum Communication Systems" by R. C. Dixon; Jatekku publisher; pp. 123 and 124 (w/ partial English translation).

Primary Examiner—Gilberto Barron, Jr.
Attorney, Agent, or Firm—Pollock, VandeSande & Priddy

[57] ABSTRACT

A spread spectrum communication system comprising a transmitter including an angle modulator, a frequency divider, a spread code generator, and a spread spectrum modulator, and a receiver including a despreading circuit, an angle demodulator, a sync detection circuit, and a clock signal generating circuit. In the transmitter, the spread code generator produces a spread code having correlation with the angle-modulated signal outputted from the angle modulator. In the receiver the despreading circuit despreads the spread spectrum modulation signal sent from the transmitter by a demodulation spread code. The angle demodulator generates a demodulation output by means of a phase-locked loop circuit contained therein. The sync detection circuit detects sync condition on the basis of noise level of a phase detector provided in the phase-locked loop circuit, and generates a sync detection signal when sync condition is established. And, the clock signal generating circuit responds the sync detection signal to switch a demodulation clock from a temporary clock used for capturing a sync time to a regular clock which is equivalent to a modulation clock signal used in the transmitter.

18 Claims, 11 Drawing Sheets

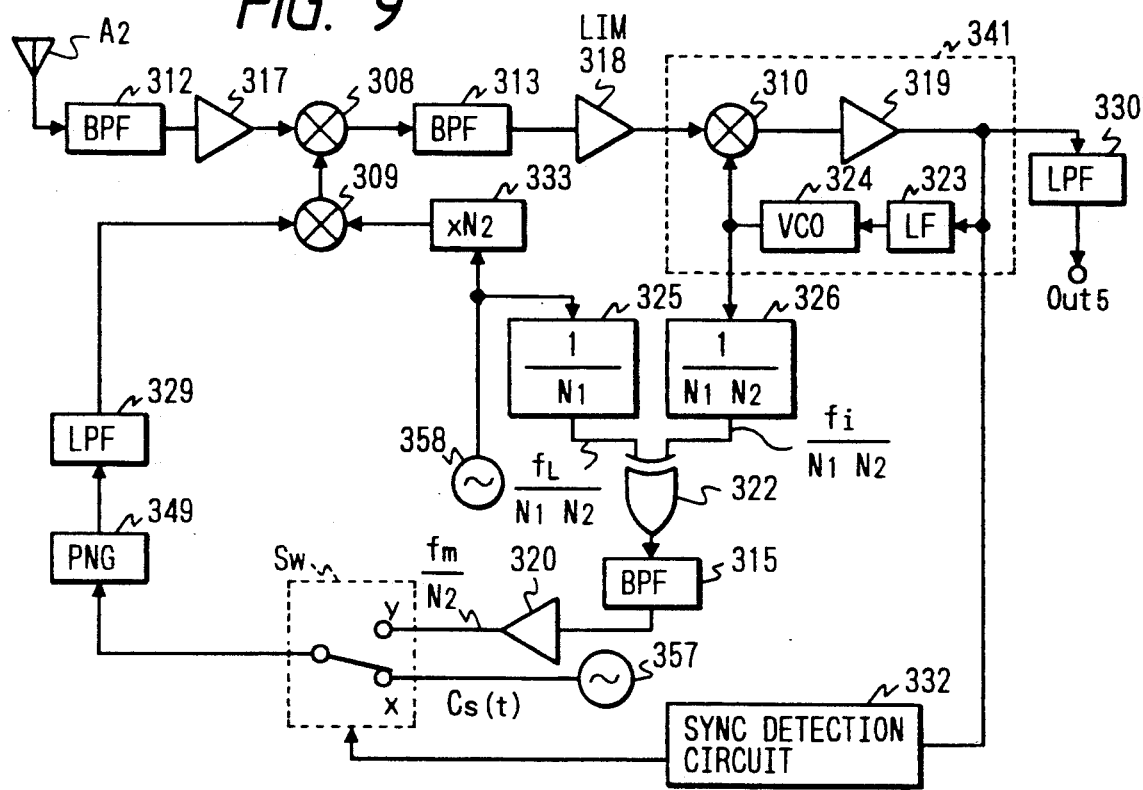
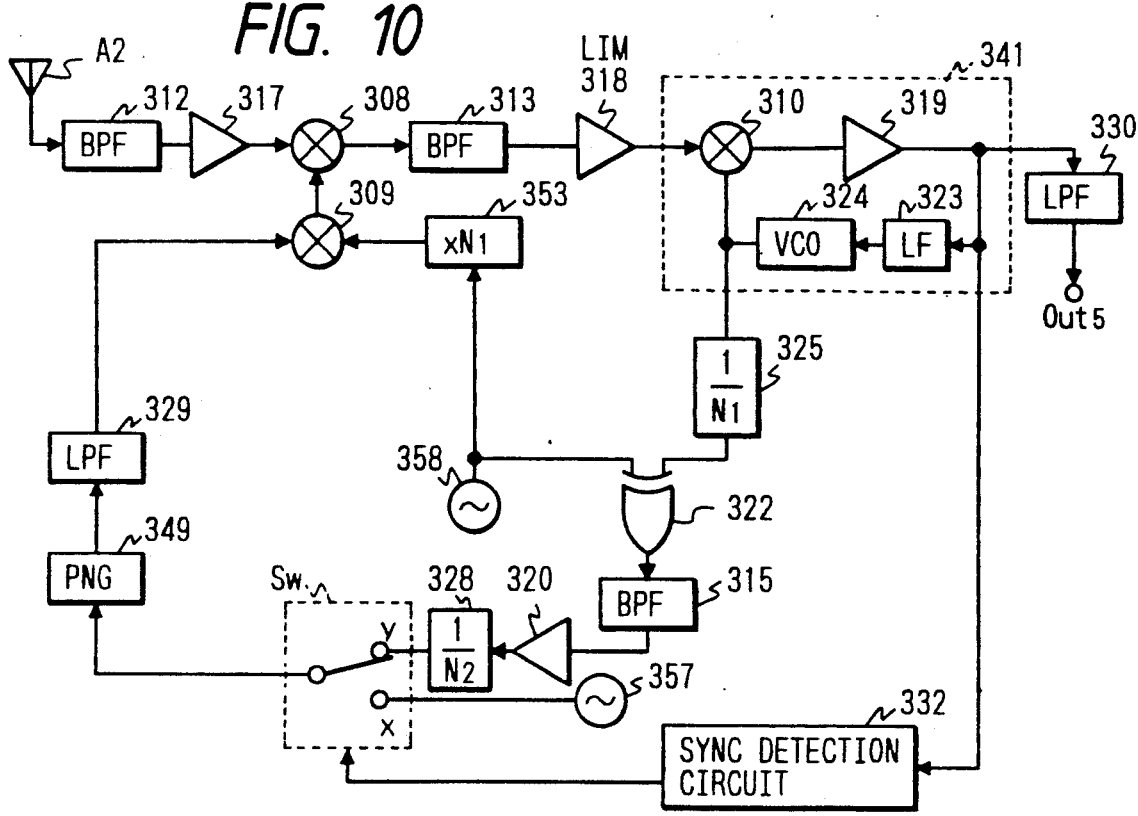

SPREAD SPECTRUM COMMUNICATION SYSTEM

BACKGROUND OF THE INVENTION

1. Field of the Invention

The present invention relates to an improvement of spread spectrum modulation/demodulation system, particularly to so-called "synchronized spread spectrum system". Spread spectrum (SS) communication system is superior to others in noise durability, and capable of transmitting intelligence with less electric power. Therefore, this system is now expected as a prospective communication means from the view point of effective use of radio wave.

However, the neck engineering in the SS communication system is the complicated circuit constitution of the receiver that is required for reproducing the spread code (i.e. Pseudo-Noise (PN) code) which is spread when transmitted from the transmitter. The synchronized spread spectrum system has been developed as a means for simplifying the reproduction of the spread code in the receiver while maintaining the characteristics of the SS communication system.

2. Description of the Related Art:

In the SS communication, capturing the synchronous time and holding the synchronous condition are both necessary techniques. And, various methods have been proposed and practiced.

One example of the synchronous SS modulation/demodulation system will be explained with reference to FIGS. 14 through 18. FIG. 14 shows a transmitter, and FIG. 15 shows a receiver.

In FIG. 14, an oscillator 649 supplies a carrier Fi(t) to one input terminal of an angle modulator 609. A data signal d(t) is supplied from an input terminal In10 to the other input terminal of the angle modulator 609. The angle modulator 609 produces an angle-modulated signal fi(t), for example, by the phase shift keying (PSK).

The carrier Fi(t) is also supplied to a divided-by-$N_1$ circuit 625, through which the frequency of the carrier Fi(t) is divided into $1/N_1$. This divided signal is fed to a spread code generator (PNG) 648 as a clock signal thereof. The PNG 648 generates a spread code P(t) in response to this clock signal, and sends it to a mixer 610.

The mixer 610 carries out a spread spectrum (SS) modulation by multiplying the angle-modulated signal fi(t) with the spread code P(t). An output fi(t)*P(t) of the mixer 610 is supplied to a BPF 611 and outputted from an output terminal Out10.

In FIG. 15, received SS modulation signal is inputted from an input terminal In11 to a BPF 612, in which unnecessary band components are removed. After that, the signal is sent to an automatic gain control (AGC) 602. This AGC 602 is necessary for adjusting a signal into a predetermined level suitable for a later described synchronous time detection. The SS modulation signal is amplified into a predetermined level in this AGC 602. An output of the AGC 602 is fed separately to a mixer 603 and to a sync capture circuit 636 of a delayed lock loop (DLL) type.

The mixer 603 multiplies the SS modulated signal with a spread code supplied from a PNG 647 so as to carry out the despreading operation. A voltage-controlled oscillator (VCO) 621 supplies a clock signal to the PNG 647. This clock signal is set slightly higher than that in the synchronous condition. The sliding correlation and the despreading demodulation are carried out sequentially.

Here, the sliding correlation is one of technique for catching up the spread code so as to establish the synchronous condition. First of all, the spread code clock of the receiver is slightly changed from that of the transmitter. For example, the spread code clock of the transmitter is 1 MHz and that of the receiver is 1.1 MHz. Both clocks coincide with each other every 909 μs. However, phases of both codes are not always the same. That is, mutual phase slides.

When the clock phase and the code phase are both identical, the demodulation signal increases abruptly. Therefore, by returning the clock signal frequency of the receiver to the regular value, the normal despreading operation is stably carried out after this time.

The mixer 603 outputs a despreading signal P(t)*p(t)*fi(t) to mixers 604 and 695 in a carrier reproduction circuit 650, as a result of multiplication of SS modulated signal P(t)*fi(t) and the spread code p(t). A VCO 622 is an oscillator which follows the carrier Fi(t) of the oscillator 649. An output of the VCO 622 is supplied directly to the mixer 604, and on the other hand through a phase shifter 623 to the mixer 605. The phase shifter 623 gives a signal a phase difference of $\pi/2$.

These mixers 604, 605 multiply thus supplied VCO values with the output of the mixer 603. Outputs of these mixers 604, 605 are fed to an LPF 617 and an LPF 618, respectively, and multiplied with each other in a mixer 606. An output of the mixer 606 is supplied to a loop filter (LF) 624. As a result, the LF 624 generates an average error between the VCO 622 and the angle-modulated signal. In response to this average error, the VCO 622 is controlled so that the VCO 622 follows the angle-modulated signal.

In this manner, the carrier is reproduced through the VCO 622. With this function, the mixer 604 serves as a synchronous time detector with respect to the angle-modulated signal. Its output is fed to the LPF 617 and outputted from an output terminal Out11, and also fed to a threshold level detector 634 as a detection signal for detecting the synchronous time of the spread code which will be described later.

Next, the sync capture operation is explained. The SS modulation signal inputted through the BPF 612 and the AGC 602 is supplied to the DLL-type sync capture circuit 636. FIG. 16 shows the detailed construction of the DLL-type sync capture circuit 636. In FIG. 16, the SS modulated signal inputted through an input terminal In12 is added to mixers 607 and 608. A spread code P(t−Δt), whose phase is advanced with respect to the regular spread code P(t) by 1 bit of the code, and a spread code P(t+Δt), whose phase is delayed with respect to the regular spread code P(t) by 1 bit of the code are supplied to these mixers 607, 608 through input terminals In13 and In14.

Accordingly, at the time when the spread code is reproduced, an output of each mixer 607 or 608 becomes an angle-modulated signal fi(t) as a result of the despreading operation of the SS modulation signal. The maximum values are obtained at the points where the phase of the spreading code is offset by ±1 bit. These two outputs are fed through BPF 613, 614 to absolute-value circuits 638, 639.

In these absolute-value circuits 638, 639, the envelope of signal is detected. A subtraction circuit 640 generates a difference of output values of these two absolute-value circuits 638, 639. An output of the subtraction circuit 640 is supplied to an LF 628 and outputted through an output terminal Out12.

This output is inputted into the adder 642, and fed back to the VCO 621 so as to control this VCO 621 with the difference value of the subtraction circuit 640. The control characteristics of this control loop is shown in FIG. 17, an abscissa of which represents a phase of the spread code generated in the PNG 647. Points (A) and (B) correspond to phase offsets of ±1 bit, respectively. A point (C) corresponds to the regular phase, and is a sync capture point.

As there is a difference between the clock of the PNG 647 and the regular clock, a point where both phases coincide with each other appears at an interval corresponding to this difference. If the phase of the spread code generated in the PNG 647 is identical with that of the regular spread code P(t), the despreading operation is carried out. And, the mixer 603 generates an angle-modulated signal fi(t). The reproduction of the carrier is done in the carrier reproduction circuit 650. As a result, the demodulation output increases abruptly. FIG. 18 shows the steep increase in the level of the demodulation output, maximum value of which is obtained at time t0.

The threshold level detector 634 detects this steep increase, by comparing the demodulation output with a predetermined threshold value (SHL). On the basis of this detection, the threshold level detector 634 outputs a control signal to a shaping circuit 635, which generates a direct current which gives a frequency offset to the VCO 621. This direct current is added with the control signal of the DLL-type sync capture circuit 636 in the adder 642. The clock supplied to the PNG 647 is then equalized to the regular clock. The synchronous condition is thus caught up. After that, the demodulation apparatus repeats the steady operation.

In this synchronous SS modulation/demodulation system, as is explained in the foregoing description, the synchronous time detection fairly depends on a signal level. Therefore, the AGC 602 is definitely necessary. Furthermore, two VCO control loops are also necessary. Thus, the circuit tends to be complicate.

SUMMARY OF THE INVENTION

Accordingly, the present invention has a purpose, in view of above-described problems or disadvantages, to provide an improved SS modulation/demodulation system which is capable of simplifying the circuit construction.

In order to accomplish above purpose, a first aspect of the present invention provides a spread spectrum communication system comprising a transmitter including an angle modulation means, a frequency divider, a spread code generating means, and a spread spectrum modulation means, and a receiver including a despreading means, an angle demodulation means, a sync detection means, and a clock signal generating means.

In the transmitter, the angle modulation means inputs intelligence signals to perform angle modulation. The frequency divider inputs an angle-modulated signal outputted from the angle modulation means and divides the frequency of this angle-modulated signal by a first dividing number to generate a modulation clock signal. The spread code generating means produces a spread code on the basis of the clock signal. The spread spectrum modulation means modulates the angle-modulated signal by the spread code to output a spread spectrum modulation signal.

In the receiver, the despreading means inputs the spread spectrum modulation signal and despreads it by a demodulation spread code. The angle demodulation means generates a demodulation output by means of a phase-locked loop circuit contained therein, which performs angle demodulation of a despreading signal outputted from the despreading means. The sync detection means detects sync condition on the basis of noise level of a phase detector provided in the phase-locked loop circuit, and generates a sync detection signal when sync condition is established. And, the clock signal generating means responds the sync detection signal to switch a demodulation clock between first and second values so as to change the demodulation spread code. Here, the first value is obtained by dividing an output of a voltage-controlled oscillator provided in the phase-locked loop circuit by the first dividing number. The second value is obtained by dividing the output of the voltage-controlled oscillator by a second dividing number which is slightly different from the first dividing number.

Furthermore, a second aspect of the present invention provides a spread spectrum communication system comprising a transmitter including an angle modulation means, a first frequency divider, a spread code generating means, and a spread spectrum modulation means, and a receiver including a despreading means, an angle demodulation means, a beat-up means, a second frequency divider, a sync detection means, and a clock signal generating means.

In the transmitter, the angle modulation means inputs intelligence signals to perform angle modulation. The first frequency divider inputs an angle-modulated signal outputted from the angle modulation means and divides the frequency of this angle-modulated signal by a first dividing number to generate a modulation clock signal. The spread code generating means produces a spread code on the basis of the modulation clock signal. The spread spectrum modulation means modulates the angle-modulated signal by the spread code to output a spread spectrum modulation signal.

In the receiver, the despreading means inputs the spread spectrum modulation signal and despreads it by a multiplication output of a demodulation spread code and an oscillation output of a local oscillator, so as to produce an despreading signal of an intermediate-frequency. The angle demodulation means generates a demodulation output by means of a phase-locked loop circuit contained therein, which performs angle demodulation of the despreading signal outputted from said despreading means. The beat-up means multiplies an output of voltage-controlled oscillator provided in the phase-locked loop circuit and the oscillation output of the local oscillator so as to generate a beat-up output. The second frequency divider generates two divided outputs by dividing the beat-up output by the first dividing number and a second dividing number being different from the first dividing number, respectively. The sync detection means detects sync condition on the basis of noise level of a phase detector provided in the phase-locked loop circuit, and generates a sync detection signal when sync condition is established. And, the clock signal generating means responds the sync detection signal to switch a demodulation clock between the two divided outputs of the second frequency divider so as to change the demodulation spread code.

Moreover, a third aspect of the present invention provides a spread spectrum communication system comprising a transmitter and a receiver.

In the transmitter, an angle modulator inputs intelligence signals and performs angle modulation with a carrier having a predetermined carrier frequency to generate an angle-modulated signal. A first local oscillator outputs a local oscillation signal having a frequency different from the carrier frequency. A first frequency multiplier multiplies the frequency of the local oscillation signal with a multiple number $N_1$. A first mixer multiplies the angle-modulated signal with the multiplied-by-$N_1$ local oscillation signal so as to perform up-conversion. A first frequency divider divides the angle-modulated signal into $1/N_1$ to obtain a first divided angle-modulated signal. A second mixer multiplies an output of the first frequency divider with the local oscillation signal to perform up-conversion. A second frequency divider divides an output of the second mixer into $1/N_2$ to obtain a second divided angle-modulated signal. A first spread code generator generates a spread code by using the second divided angle-modulated signal as a modulation clock signal. And, a third mixer multiplies an output of the first mixer with the spread code to output a spread spectrum modulation signal.

In the receiver, a despreading circuit inputs the spread spectrum modulation signal and despreads it by a demodulation spread code to perform despreading demodulation. A second local oscillator outputs a local oscillation signal having the same frequency as the first local oscillator. A second frequency multiplier multiplies the frequency of the local oscillation signal of the second local oscillator with the multiple number $N_1$. A fourth mixer multiplies an output of the despreading circuit with an output of the second frequency multiplier to perform down-conversion. An angle demodulator of a phase-locked loop type generates an angle-demodulated output on the basis of an output of the fourth mixer. A third frequency divider divides an output of a voltage-controlled oscillator provided in the angle demodulator into $1/N_1$. A fifth mixer multiplies an output of the third frequency divider with the local oscillation signal of the second local oscillator to perform up-conversion. Fourth and fifth frequency dividers divide an output of the fifth mixer into $1/N_2$ and $1/N_3$, respectively. A sync detection circuit detects sync condition on the basis of noise level of a phase detector provided in the angle demodulator and generates a sync detection signal when sync condition is established. A switching circuit alternatively selects either of the fourth and fifth frequency dividers in response to the sync detection signal as a demodulation clock signal. And, a second spread code generator produces the demodulation spread code on the basis of the demodulation clock signal.

Still further, a fourth aspect of the present invention provides a spread spectrum communication system comprising a transmitter and a receiver.

In the transmitter, an angle modulator inputs intelligence signals and performs angle modulation with a carrier having a predetermined carrier frequency to generate an angle-modulated signal. A first frequency divider divides the angle-modulated signal into $1/N_1$ to obtain a first divided angle-modulated signal. A first local oscillator outputs a local oscillation signal having a frequency different from the carrier frequency. A first frequency multiplier multiplies the frequency of the local oscillation signal with a multiple number $N_1$. A first mixer multiplies the first divided angle-modulated signal with the local oscillation signal so as to perform up-conversion. A second frequency divider divides an output of the first mixer into $1/N_2$ to obtain a second divided angle-modulated signal. A first spread code generator generate a spread code by using the second divided angle-modulated signal as a modulation clock signal. A second mixer multiplies the spread code with the multiplies-by-$N_1$ local oscillation signal to obtain a carrier-modulated spread code. And, a third mixer multiplies the carrier-modulated spread code with the angle-modulated signal to output a spread spectrum modulation signal. The receiver of this fourth aspect is the same as the third aspect.

Yet further, a fifth aspect of the present invention provides a spread spectrum communication system comprising: an angle modulation means for inputting intelligence signals to perform angle modulation; a frequency multiplier for multiplying an angle-modulated signal outputted from said angle modulation means with a multiple number $N_1$; a frequency divider for dividing said angle-modulated signal by a dividing number $N_2$ generate a modulation clock signal; a spread code generating means for producing a spread code on the basis of said modulation clock signal; and a spread spectrum modulation means for modulating said angle-modulated signal outputted from said frequency multiplier by said spread code to output a spread spectrum modulation signal.

Moreover, a sixth aspect of the present invention provides a spread spectrum communication system comprising: a local oscillator for outputting a local oscillation signal; a frequency converter means for converting a frequency of a demodulation spread code into an intermediate frequency by using said local oscillation signal; a despreading means for multiplying said demodulation spread code converted into an intermediate-frequency with a spread spectrum modulation signal to obtain a despreading signal; a phase-locked loop means for generating an angle-demodulated signal on the basis of said despreading signal; a clock signal generating means for generating a demodulation clock signal on the basis of an output of a voltage-controlled oscillator provided in said phase-locked loop means and said local oscillation signal of said local oscillator; a demodulation spreading code generating means for producing said demodulation spread code on the basis of said demodulation clock signal obtained by said clock signal generating means; and a sync capture means for generating a control signal on the basis of said angle-demodulated signal to capture sync condition during spread spectrum demodulation.

Still further, a seventh aspect of the present invention provides a spread spectrum communication system comprising a transmitter and a receiver.

In the transmitter, a plurality of primary modulation means inputs intelligence signals and outputs a plurality of angle-modulated signals. An adder means adds the plurality of angle-modulated signals to generate a frequency division multiplex signal. A frequency divider generates a clock signal by using either of said plurality of angle-modulated signals. A spread code generating means generates a spread code on the basis of said clock signal. And, a spread spectrum modulation means modulates said multiplex signal by the spread code to output a spread spectrum modulation signal.

In the receiver, a despreading means inputs said spread spectrum modulation signal and despreads it by a demodulation spread code. A plurality of band pass filters separate a plurality of angle-modulated signals from an output of the despreading means. A first angle demodulation means generates a demodulation output by means of a phase-locked loop circuit contained therein, which performs angle demodulation of one angle-modulated signal of the plurality of band pass filters relating to said demodulation spread code. A clock signal generating means divides an output of a voltage-controlled oscillator provided in the phase-locked loop circuit to generate a demodulation clock signal of the demodulation spread code. A sync detection means detects sync condition on the basis of noise level of a phase detector provided in said phase-locked loop circuit, and generates a sync detection signal when sync condition is established. A sync capture means captures a spread spectrum sync time in response to the sync detection signal. And, a second angle modulation means for performing angle modulation of remainder of said angle-modulated signals.

The above and other objects, features and advantages of the present invention will become more apparent from the following detailed description which is to be read in conjunction with the accompanying drawings.

BRIEF DESCRIPTION OF THE DRAWINGS

FIGS. 8, 9, and 10 are schematic block diagrams showing modifications of the receiver of FIG. 7(B);

DETAILED DESCRIPTION OF THE PREFERRED EMBODIMENTS

Hereinafter, with reference to accompanying drawings, preferred embodiments of the present invention are explained in detail.

First Embodiment

Figure 1A:
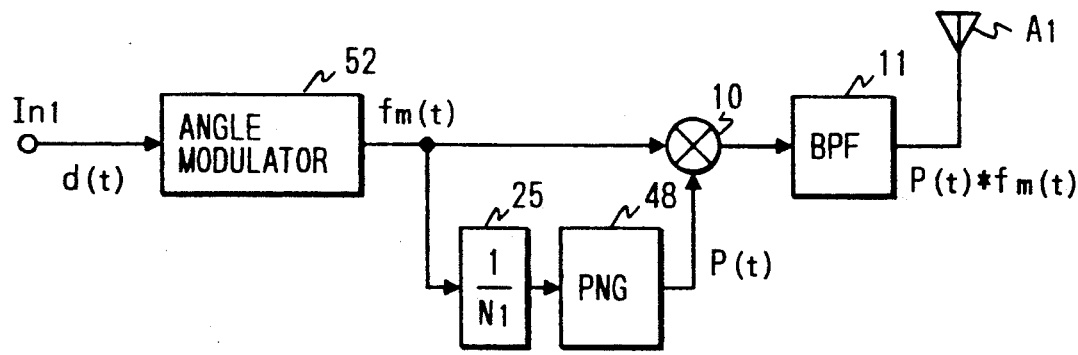
FIG. 1(A) is a schematic block diagram showing a transmitter of the SS modulation/demodulation system in accordance with a first embodiment of the present invention.
Figure 1B:
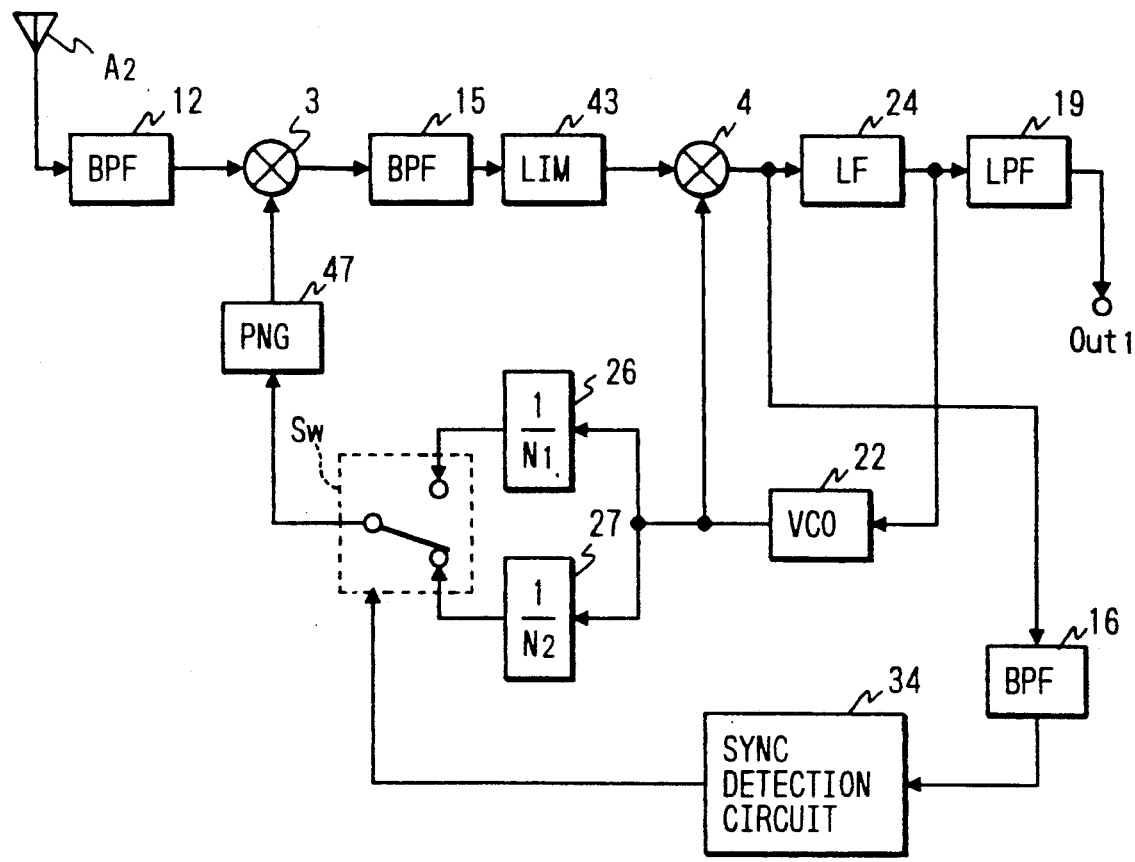
FIG. 1(B) is a schematic block diagram showing a receiver of the SS modulation/demodulation system in accordance with the first embodiment of the present invention.

A first embodiment of the spread spectrum modulation/demodulation system in accordance with the present invention is explained with reference to FIGS. 1(A), 1(B) and FIGS. 2(A), 2(B). FIG. 1(A) shows a transmitter which is used for generating and amplifying a radio-frequency carrier signal, modulating the carrier signal with intelligence, and feeding the modulated carrier to an antenna for radiation into space as electromagnetic waves. FIG. 1(B) shows a receiver which converts radio waves into intelligible sounds or other perceptible signals.

In FIG. 1(A), an intelligence signal d(t) is supplied from an input terminal In1 to an angle modulator 52. Here, the intelligence signal d(t) includes data, information, or messages that are to be transmitted. The angle modulation is generally known as frequency modulation (FM) and phase modulation (PM). But, FSK (Frequency Shift Keying), MSK (Minimum Shift Keying) and GMSK (Gausian Minimum Shift Keying) are also included in this angle modulation in a broad sense.

An angle-modulated signal fm(t) is generated from the angle modulator 52, and is supplied on one hand to a mixer 10 and on the other hand to a divide-by-$N_1$ circuit 25. Here, $N_1$ is an integer more than 2. Hereinafter, the frequency divider such as the divided-by-$N_1$ circuit 25 is a harmonic conversion transducer in which the frequency of the output signal is an integral submultiple of the input frequency.

The mixer 10 serves to generate spread spectrum modulation waves. The divide-by-$N_1$ circuit 25 divides the frequency of the angle-modulated signal fm(t) into $1/N_1$ to generate a clock signal CO(t).

This clock signal CO(t) is fed to a spread code generator (abbreviated by PNG) 48. The spread code generator 48 generates a pseudo noise, which is referred to as a spread code P(t) hereinafter, in response to this clock signal CO(t). The spread code P(t) is supplied to the mixer 10. The mixer 10 multiplies this spread code P(t) with the angle-modulated signal fm(t) to obtain a spread spectrum (SS) modulation signal P(t)*fm(t). Thereafter, this SS modulation signal P(t)*fm(t) is outputted from an antenna A1 through a BPF 11. The abbreviation BPF represents a band pass filter.

Next, in FIG. 1(B), thus transmitted SS modulation signal is received by an antenna A2 in the receiver. The SS modulation signal is inputted into a BPF 12, in which unnecessary frequency components outside of the main lobe band are attenuated. Then, the SS modulation signal is sent to one input terminal of a mixer 3. Since the SS modulation signal includes a noise n(t) during transmission to the receiver, its form is now represented as P(t)*fm(t)+n(t).

A spread code generator (abbreviated by PNG) 47 supplies a spread code $\rho(t)$ to the other input terminal of the mixer 3. The mixer 3 multiplies this spread code $\rho(t)$ with the SS modulation signal and generates an output of P(t)*fm(t)*$\rho(t)$+n(t)*$\rho(t)$.

This output signal P(t)*fm(t)*$\rho(t)$+n(t)*$\rho(t)$ is supplied to a BPF 15, which transmits signals within a band width of an angle-modulated frequency. Thus, the angle-modulated signal component and a part of other spread components are transmitted through this BPF 15 to a limiting amplifier (abbreviated by LIM) 43. The limiting amplifier 43 acts to prevent the amplitude of an electronic waveform from exceeding a specified level while preserving the shape of the waveform at amplitudes less than the specified level.

The signal, whose amplitude is limited by the limiting amplifier 43, is inputted into a phase detector 4. This phase detector 4 constitutes a phase-locked loop (PLL) together with a voltage-controlled oscillator (VCO) 22 and a loop filter (LF) 24. That is, the phase detector 4 compares the frequency of the VCO 22 with that of the incoming carrier signal. Thus, the phase detector 4 generates a phase comparison signal E(t) based on a phase difference between the signal of the limiting amplifier 43 and the signal fm'(t) of the VCO 22. By feeding this phase comparison signal E(t) through the LF 24 to the VCO 22, the control of the PLL is executed so that the output of the VCO 22 can lock the angle-modulated signal. As the result of PLL locking, the VCO 22 regenerates the modulated signal fm(t) and the phase comparison signal E(t) provides the demodulated signal d(t) shown in FIG. 1(A).

On the other hand, the output signal of the VCO 22 is fed to the PNG 47 through a divided-by-$N_2$ circuit 27 and a switching circuit Sw. Here, $N_2$ is an integer more than 2. The divide-by-$N_2$ circuit 27 divides the frequency of the output signal of the VCO 22 into $1/N_2$ to generate a clock signal C1(t). In response to this clock signal C1(t), the PNG 47 generates the spread code $\rho(t)$.

Furthermore, a BPF 16 is connected to the phase detector 4. This BPF 16 transmits noise components, whose frequencies are slightly higher than that of the intelligence signal, to a sync detection circuit 34.

Figure 2A:
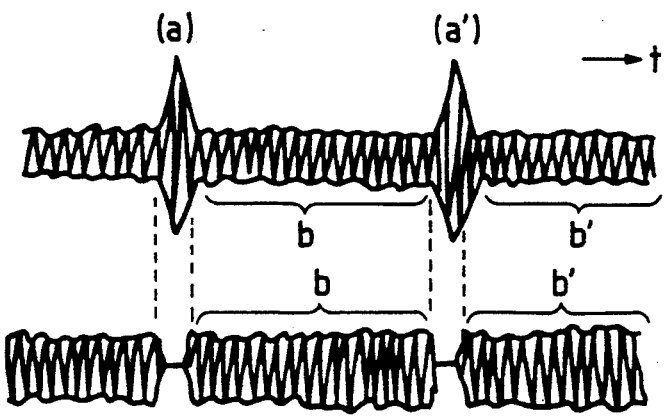
FIG. 2(A) shows the output signal of the phase detector of the receiver in accordance with the first embodiment in the synchronous time detection.

FIG. 2(A) shows the output signal of the phase detector 4, generated during synchronous time detection. In this drawing, two peaks (a) and (a') correspond to the points where the spread codes are correlated. And, the signals obtained at these points are intelligence signals having been modulated. On the other hand, sections (b) and (b') correspond to the periods during which no correlation is obtained between spread codes. And, this signals obtained during these sections are almost noise components.

Figure 2B:
FIG. 2(B) shows the output signal of the BPF of the receiver in accordance with the first embodiment, which exclusively takes out the noise components of the phase detector.

FIG. 2(B) shows the output signal of the BPF 16 which exclusively takes out the noise components of the phase detector 4. The sync detection circuit 34 compares this output signal of the BPF 16 with a predetermined threshold value. If this output signal (i.e. noise component) reduces less than the threshold value at a certain time, it is recognized that this time is the synchronous time.

On the basis of the judgement of the synchronous time, the sync detection circuit 34 outputs a changeover signal to the switching circuit Sw, so as to connect a movable contact of the switching circuit Sw to an output terminal of a divided-by-$N_1$ circuit 26.

The divided-by-$N_1$ circuit 26 has the same dividing number as the divided-by-$N_1$ circuit 25 used in the modulation stage. It means that the divide-by-$N_1$ circuit 26 can generate a clock signal C0(t) which is equal to that of the divided-by-$N_1$ circuit 25 in both frequency and phase.

This clock signal C0(t) is supplied to the spread code generator 47, thereby obtaining the spread code P(t). By inputting this spread code P(t) into the mixer 3, the despreading process is taken place therein.

Accordingly, the despreading output becomes $P^2(t)$*fm(t)+P(t)*n(t). As is well known, $P^2(t)$ equal to 1 (i.e. direct current). Therefore, the despreading output can be more simply expressed as fm(t)+P(t)*n(t). Thus, the signal of fm(t)+n'(t) is fed to the limiting amplifier 43 through the BPF 15.

In this manner, SS-synchronization is established and regular SS demodulation is initiated. The PLL circuit consisting of the phase detector 4, the LF 24 and the VCO 22 executes the PLL angle demodulation, thereby outputting a demodulation intelligence signal to an output terminal Out1 through a low pass filter (LPF) 19.

In accordance with this first embodiment, the clock signal for generating the spread code is generated by dividing the modulated signal of the angle modulation circuit in the transmitter. In other words, the angle modulated signal and the spread code can be correlated in the synchronous relationship. With this arrangement, an output of the PLL circuit, equipped in the receiver for demodulating the angle-modulated signal, can be effectively utilized as the clock signal for the spread code in the demodulation.

As a consequence, no delayed lock loop (DLL) and no automatic gain controller (AGC) is necessary, resulting in a simpler circuit configuration compared with conventional circuits.

Second Embodiment

A second embodiment of the spread spectrum modulation/demodulation system in accordance with the present invention is explained with reference to FIG. 3.

Figure 3:
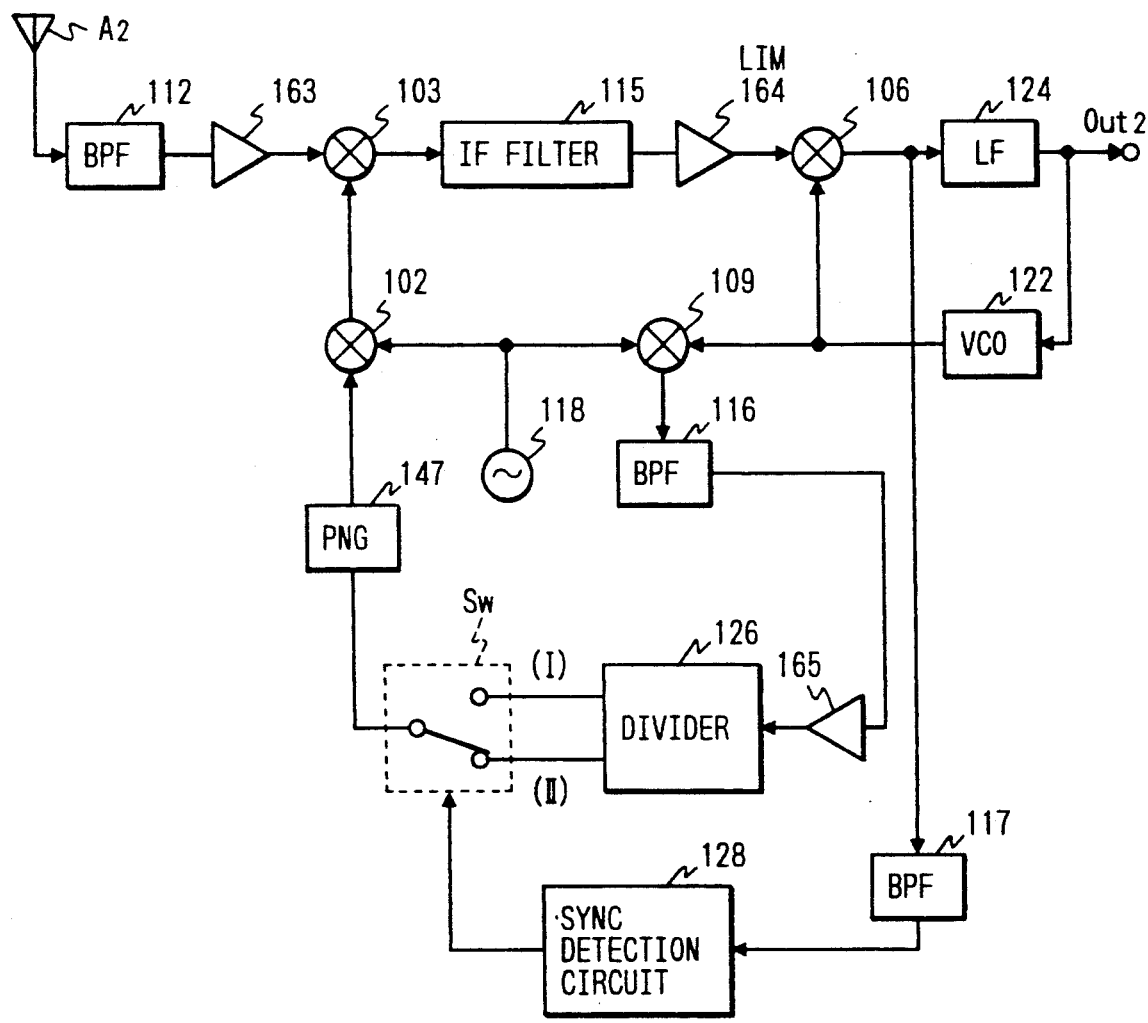
FIG. 3 is a schematic block diagram showing a receiver of the SS modulation/demodulation system in accordance with a second embodiment of the present invention.

In FIG. 3, a transmitted SS modulation signal described in the first embodiment is received by an antenna A2 in the receiver, and then inputted into one input terminal of a mixer 103 through a BPF 112 and a high-frequency amplifier 162. A local oscillator 118 generates a local oscillation signal f0(t). A spread code generator 147 provided for the demodulation generates a spread code $\rho(t)$. A mixer 102 inputs both the local oscillation signal f0(t) and the spread code $\rho(t)$, and multiplies them to generate an output signal $\rho(t)*f0(t)$. This output signal $\rho(t)*f0(t)$ is supplied to the other input terminal of the mixer 103. The mixer 103 multiplies the output signal $\rho(t)*f0(t)$ with the SS modulation signal $P(t)*f(t)$, and outputs a multiplied output signal $P(t)*\rho(t)*fm(t)*f0(t)$ to a phase detector 106 through an intermediate frequency (IF) filter 115 and alimiting amplifier 164 of intermediate frequency (IF).

The phase detector 106 constitutes a phase-locked loop (PLL) together with a voltage-controlled oscillator (VCO) 122 and a loop filter (LF) 124.

The output signal of the phase detector 106 is further supplied to a BPF 117. This BPF 117 transmits noise components, whose frequencies are slightly higher than that of the intelligence signal, to a sync detection circuit 128. In the same manner as the sync detection circuit 34 in the first embodiment explained with reference to FIGS. 2(A) and 2(B), this sync detection circuit 128 acts to detect the synchronous time by comparing the output signal of the BPF 117 with a predetermined threshold value. If this output signal (i.e. noise component) reduces less than the threshold value at a certain time, it is recognized that this time is the synchronous time.

On the basis of the judgement of the synchronous time, the sync detection circuit 128 outputs a control signal to a switching circuit Sw.

An output signal of the VCO 122 constituting the PLL is supplied to one input terminal of a mixer 109. An output signal f0(t) of the local oscillator 118 is supplied to the other input terminal of the mixer 109. The mixer 109 multiplies these two output signals so as to execute a beat-up operation. Here, the beat-up operation means that a frequency of a signal is converted into a higher frequency.

The beat-up output signal is sent to a divider 126 through a BPF 116 and an amplifier 165. The divider 126 generates two output signals (I) and (II) simultaneously. One output signal (I) is a dividing output of $1/N_1$, while the other output signal (II) is a dividing output of $1/N_2$.

Before the synchronous condition is established, the dividing output of $1/N_2$ is supplied through the switching circuit Sw to the PNG 147, as a clock signal C'(t). The PNG 147 generates the spread code $\rho(t)$. In other words, it is judged that the synchronous condition has not been established yet as long as this spread code $\rho(t)$ is continuously generated. Accordingly, the phase detector 106 consistently outputs large noises to the BPF 117.

However, once the sync detection circuit 128 detects a first synchronous time, it outputs a control signal to the switching circuit Sw so that the dividing output signal of $1/N_1$ is outputted to the PNG 147 as a clock signal through the switching circuit Sw. In response to this clock signal, the PNG 147 generates a spread code P(t).

This spread code P(t) is multiplied with the output of the local oscillator 118 in the mixer 102, so as to generate an output signal $P(t)*f0(t)$. This output signal $P(t)*f0(t)$ is then supplied to the mixer 103. The mixer 103 multiplies this output signal $P(t)*f0(t)$ with the SS modulated signal $P(t)*fm(t)$ sent from the transmitter through the antenna A2, the BPF 112 and the high-frequency amplifier 163, thereby carrying out the despreading operation and generating a primary modulated signal fi(t) of an intermediate frequency.

This primary modulated signal fi(t) is then supplied to the phase detector 106 through the IF filter 115 and the limiting amplifier 164. The PLL including the phase detector 106, the LF 124 and the VCO 122 locks this primary modulated signal fi(t) and carries out the PLL demodulation. Then, the demodulated intelligible sounds or other perceptible signals are outputted from an output terminal Out2.

Though the output signal of the VCO 122 is locked by the primary modulated signal fi(t), it has no synchronous relationship with the received signal as the local oscillator output cos $\omega t$ intervenes. Accordingly, it cannot be utilized as a clock signal by directly dividing it.

In order to resolve this, the mixer 109 carries out a beat-up operation by multiplying the output signal of the VCO 122 with the local oscillator output f0(t). Thus, the output signal of the BPF 16 can be obtained as an approximate primary modulation signal fm(t).

Figure 4:
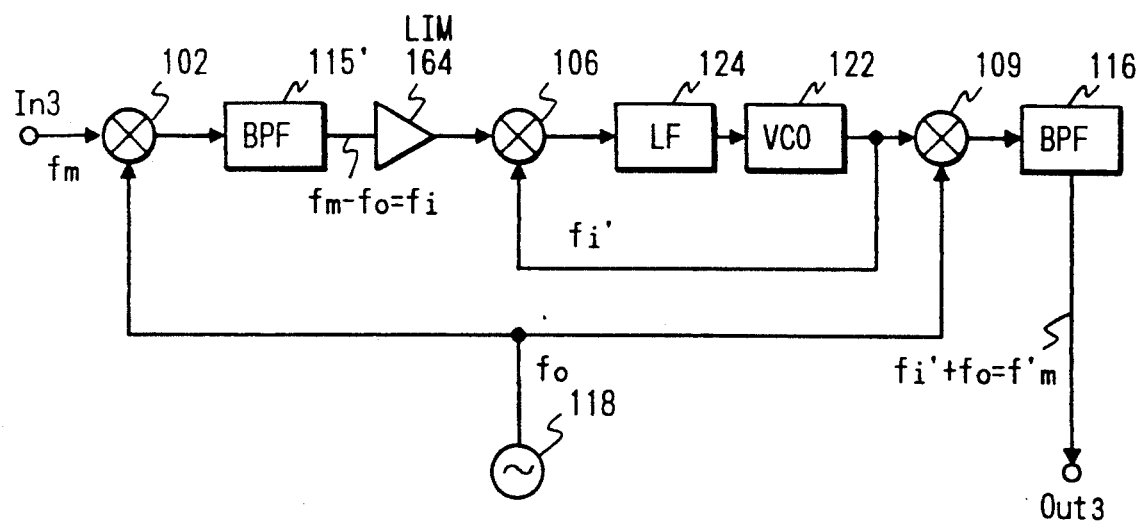
FIG. 4 is a schematic block diagram showing the principle for obtaining the synchronous relationship in the second embodiment.

Here, the principle for obtaining the synchronous relationship is explained with reference to FIG. 4. In this drawings, the same components as those of FIGS. 1 and 3 are suffixed by the same reference numerals and a letter "f*" denotes a frequency of a signal f*(t).

When the synchronous condition is established between the PNG 48 and the PNG 147, the received signal $P(t)*fm(t)$ can be regarded as the primary modulation signal fm(t) and, then, the input signal fm(t) of a high frequency is supplied to the mixer 102 through an input terminal In3. The input signal fm(t) is multiplied with a local oscillator signal f0(t) in the mixer 102. In this case, sum and difference of these two signals are obtained as the multiplied output. Therefore, there is provided a BPF 115', which transmits the difference of these two signals, as the IF filter 115. Namely, the input signal fm(t) is converted into an intermediate frequency (IF) signal fi(=fm−f0), as a result of a beat-down operation. The beat-down operation means that a frequency of a signal is converted into a lower frequency.

After being amplified in the IF amplifier 164, this IF signal fi is supplied to the phase detector 106. The phase detector 106 carries out the PLL operation together with the LF 124 and the VCO 122.

Accordingly, an output of the VCO 122 becomes a signal fi' being synchronized with the input signal fi of the phase detector 106. This VCO output signal fi' includes less noise components than the input signal fi of the phase detector 106 due to tracking filter effect of the PLL. There is no significant difference between the signal fi' and the signal fi in other fundamental characteristics.

Therefore, this signal fi' is multiplied with the local oscillator output f0 in the mixer 109. Then, a beat-up signal fm'(=fi'+f0), which has less noises and less level fluctuation compared with the input signal fm, is obtained from the BPF 116 as a high-frequency signal synchronous with the input signal fm.

In this case, if the BPF 115' transmits the other beat signal fm+f0, the BPF 116 must select the other beat signal fi'−fo. That is to say, these BPF 115' and BPF 116 are cooperated to function reversely with each other.

The output signal from the mixer 109 is supplied to the frequency divider 126 through the BPF 116 and the amplifier 165 shown in FIG. 3. Then, the divider 126 generates a dividing signal of $1/N_1$, which is equivalent to that of the divider 125 in the transmitter. This dividing signal is supplied as a clock signal to the PNG 147, thereby attaining the SS demodulation which has the synchronous relationship with the input SS modulation signal.

Third Embodiment

Figure 5A:
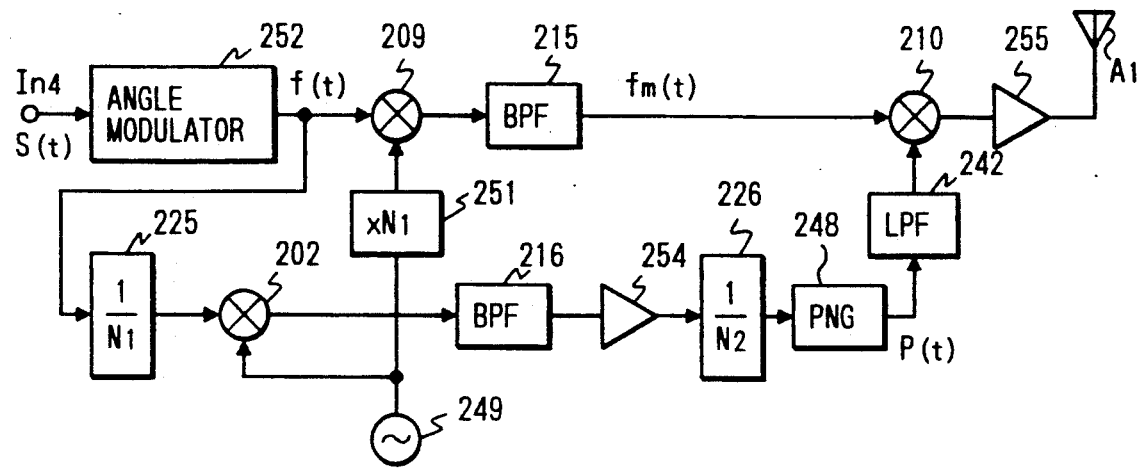
FIG. 5(A) is a schematic block diagram showing a transmitter of the SS modulation/demodulation system in accordance with a third embodiment of the present invention.
Figure 5B:
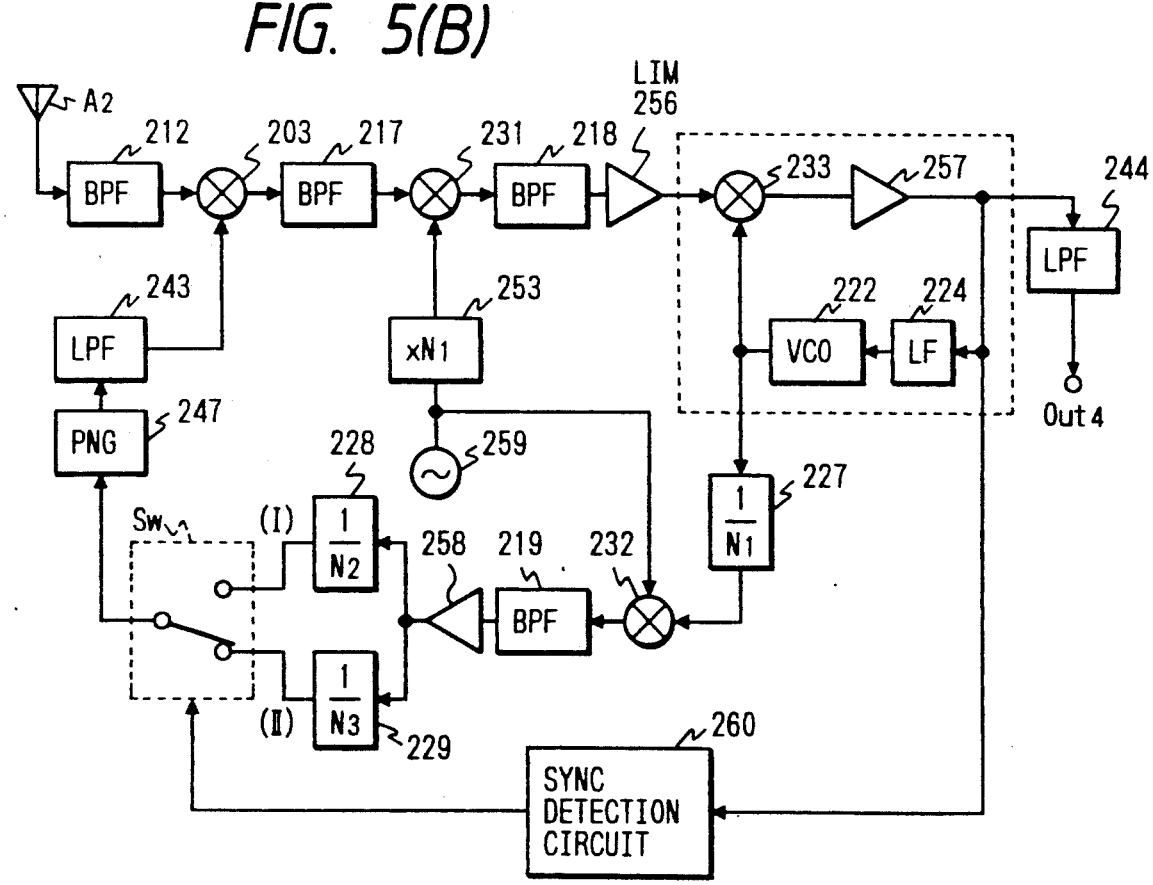
FIG. 5(B) is a schematic block diagram showing a receiver of the SS modulation/demodulation system in accordance with the third embodiment of the present invention.

A third embodiment of the spread spectrum modulation/demodulation system in accordance with the present invention is explained with reference to FIGS. 5(A) and 5(B). FIG. 5(A) shows a transmitter, while FIG. 5(B) shows a receiver.

In FIG. 5(A), an intelligence signal S(t), including audio (sound) signals or other data, is supplied to an angle modulation circuit 252 through an input terminal In4.

If the transmitting frequency is high in the previous embodiment, the angle modulation circuit must process high frequency signals directly. That results in a complicated circuit construction. In order to avoid this problem, the present embodiment uses a low-frequency carrier for the angle modulation. And, the modulated signal is up-converted to be a target transmitting frequency.

The angle modulation circuit 252 generates an angle-modulated output f(t) and supplies it to an mixer 209 and to a divided-by-$N_1$ circuit 225. A local oscillator 249, which causes an oscillation signal having a frequency of f2, supplies its output on one hand to the mixer 202 and on the other hand to a multiplied-by-$N_1$ circuit 251. Hereinafter, the frequency multiplier such as the multiplied-by-$N_1$ circuit 251 is a harmonic conversion transducer in which the frequency of the output signal is an exact integral multiple of the input frequency.

After being multiplied with a multiple number $N_1$ in the multiplied-by-$N_1$ circuit 251, the signal is supplied to the mixer 209. With this signal, the mixer 209 carries out the up-conversion of the angle-modulated output f(t).

On the other hand, the mixer 202 carried out the up-conversion of the angle-modulated output from the divided-by-$N_1$ circuit 225 by use of the local oscillator output. That is, the mixer 202 cooperates with the mixer 209 to produce the same beat signals. For example, if the mixer 209 produces a sum signal, the mixer 202 must produce a sum signal, too.

The mixer 202 supplies its output to a divided-by-$N_2$ circuit 226 through a BPF 216 and an amplifier 254. In response to this output, the divided-by-$N_2$ circuit 226 generates a clock signal and supplies it to a spread code generator (PNG) 248. Then, the PNG 248 generates a spread code P(t).

A low pass filter (LPF) 242 is interposed between the PNG 248 and a mixer 210. This LPF 242 transmits only the main lobe of the frequency spectrum of the spread code P(t) to one input terminal of the mixer 210.

The angle-modulated output fm(t), having been up-converted in the mixer 209, is entered into the other input terminal of the mixer 210 through a BPF 215. Here, $fm=(f2\times N_1)+f1$, where "fm" denotes a frequency of the fm(t).

Thus, an output of the mixer 210 is obtained as SS modulated output signal P(t)*fm(t). This signal is adequately amplified in an amplifier 255 and then transmitted through the antenna A1.

Next, the receiver is explained with reference to FIG. 5(B). The SS modulated signal P(t)*fm(t), received by the antenna A2, is supplied to a mixer 203 through a BPF 212. A spread code $\rho(t)$ is generated from a PNG 247, and is supplied to the mixer 203 through an LPF 243. The mixer 203 multiplies this spread code $\rho(t)$ with the output of the BPF 212, and generates an output signal P(t)*fm(t)*$\rho(t)$. This output signal P(t)*fm(t)*$\rho(t)$ is fed to a mixer 231 through a BPF 217.

A local oscillator 259 causes an oscillation signal having a frequency of fo.

An output signal of the local oscillator 259 is multiplied with a multiple number $N_1$ in the multiplied-by-$N_1$ circuit 253, and then supplied to the mixer 231. The mixer 231 executes the down-conversion, and then generates an intermediate-frequency signal f1(t) having a frequency of $f1=fm-(f0\cdot N_1)$, which is supplied to a phase detector 233 through a limiting amplifier 256. The phase detector 233 constitutes the PLL.

By supplying the output of the phase detector 233 to an error amplifier 157 and then to an LF 224, an error output (i.e. an angle demodulation output) is obtained and supplied to a VCO 222.

If PLL locking condition is established, an output of the VCO 222 is f'(t). The VCO output f'(t) is not only fed to the phase detector 233 but supplied to a divided-by-$N_1$ circuit 227 and whose frequency is divided into $1/N_1$. An output of the divided-by-$N_1$ circuit 227 is supplied to a mixer 232.

The mixer 232 multiplies this output with the local oscillation signal having a frequency of f0, which is supplied from the local oscillator 259, thereby executing the up-conversion therein. Thus, the mixer 232 generates an output, a frequency of which is $f0+(f1/N_1)$, through the BPF 219.

An output of the BPF 219 is simultaneously fed to a divided-by-$N_2$ circuit 228 and a divided-by-$N_3$ circuit 229. Here, $N_3$ is an integer more than 2. An output of the divided-by-$N_2$ circuit 228 has a fundamental frequency of $\{f2+(f1/N_1)\}/N_2$, while an output of the divided-by-$N_3$ circuit 229 has a fundamental frequency of $\{f2+(f1/N_1)\}/N_3$. In other words, the output frequency of the divided-by-$N_2$ circuit 228 is equal to the frequency of the clock signal of the PNG 248 in the transmitter. And, the output frequency of the divided-by-$N_3$ circuit 229 is slightly different from the frequency of the clock signal of the PNG 248 in the transmitter.

Respective output signals (I), (II) of these circuits 228, 229 are supplied to a switching circuit Sw. This switching circuit Sw is controlled by a sync detection circuit 260, which detects noise level contained in the output of the demodulation circuit (PLL) 261. The noise level is small when the SS synchronous condition is established in the PLL 261, but is large when the SS synchronous condition is not established. Therefore, the sync detection circuit 260 outputs a control signal to the switching circuit Sw when the SS synchronous condition is established. In response to this control signal, the switching circuit connects its movable contact to the divided-by-$N_2$ circuit 228.

Namely, the output of the divided-by-$N_3$ circuit 229 is supplied to the PNG 247 as a clock signal when the SS synchronous condition is not established. And, the PNG 247 generates a spread code of $\rho(t)$. This spread code $\rho(t)$ is generated during a short period of time after the receiver is activated, but is stopped if the SS synchronous condition is once established. After that, the output of the divided-by-$N_2$ circuit 228 is supplied to the PNG 247 as a clock signal. And, the PNG 247 generates a spread code of P(t) and supplies it to the mixer 203.

With this arrangement, the mixer 203 generates an output of fm(t)*P(t)*P(t). As well known, P(t)*P(t) is equal to 1. As a consequence, an output of the BPF 217 becomes a despreading demodulation output; i.e. the angle-modulated modulation output fm(t) having been up-converted. If such an SS synchronous condition is established, an output of an LPF 244 becomes an angle-demodulated signal S(t) and is outputted through an output terminal Out4.

Though the mixer 231 is interposed between the BPF 217 and the BPF 218, it can be disposed between the PNG 247 and the mixer 203 in the same manner as the mixer 102 of the second embodiment.

Modification 1

Figure 6:
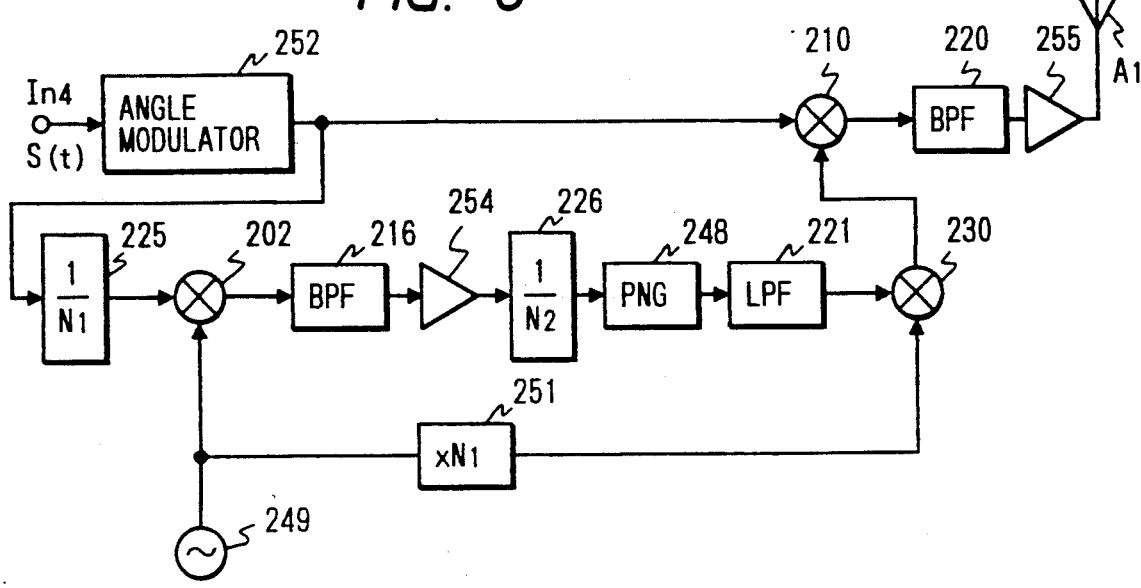
FIG. 6 is a schematic block diagram showing a modification of the transmitter of FIG. 5(A)

FIG. 6 shows a modification of the transmitter of FIG. 5(A). In this modification, the output of the multiplied-by-$N_1$ circuit 251 is supplied to a mixer 230. An output of an LPF 221 is also supplied to the mixer 230. The mixer 230 carries out the up-conversion by use of these signals. Then, the output signal of the mixer 230 is sent to the mixer 210, in which the spread modulation of the angle-modulated signal, supplied from the angle modulation circuit 252, is carried out. Thus, the same SS modulated signal as that of FIG. 5(A) is obtained.

Fourth Embodiment

Figure 7A:
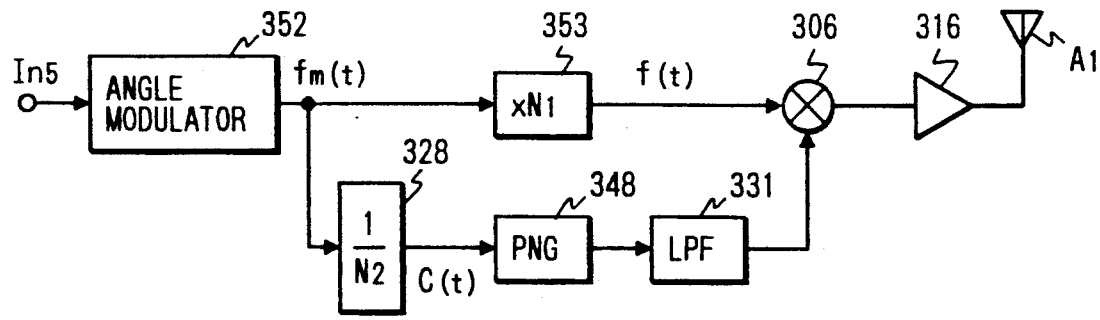
FIG. 7(A) is a schematic block diagram showing a transmitter of the SS modulation/demodulation system in accordance with a fourth embodiment of the present invention.
Figure 7B:
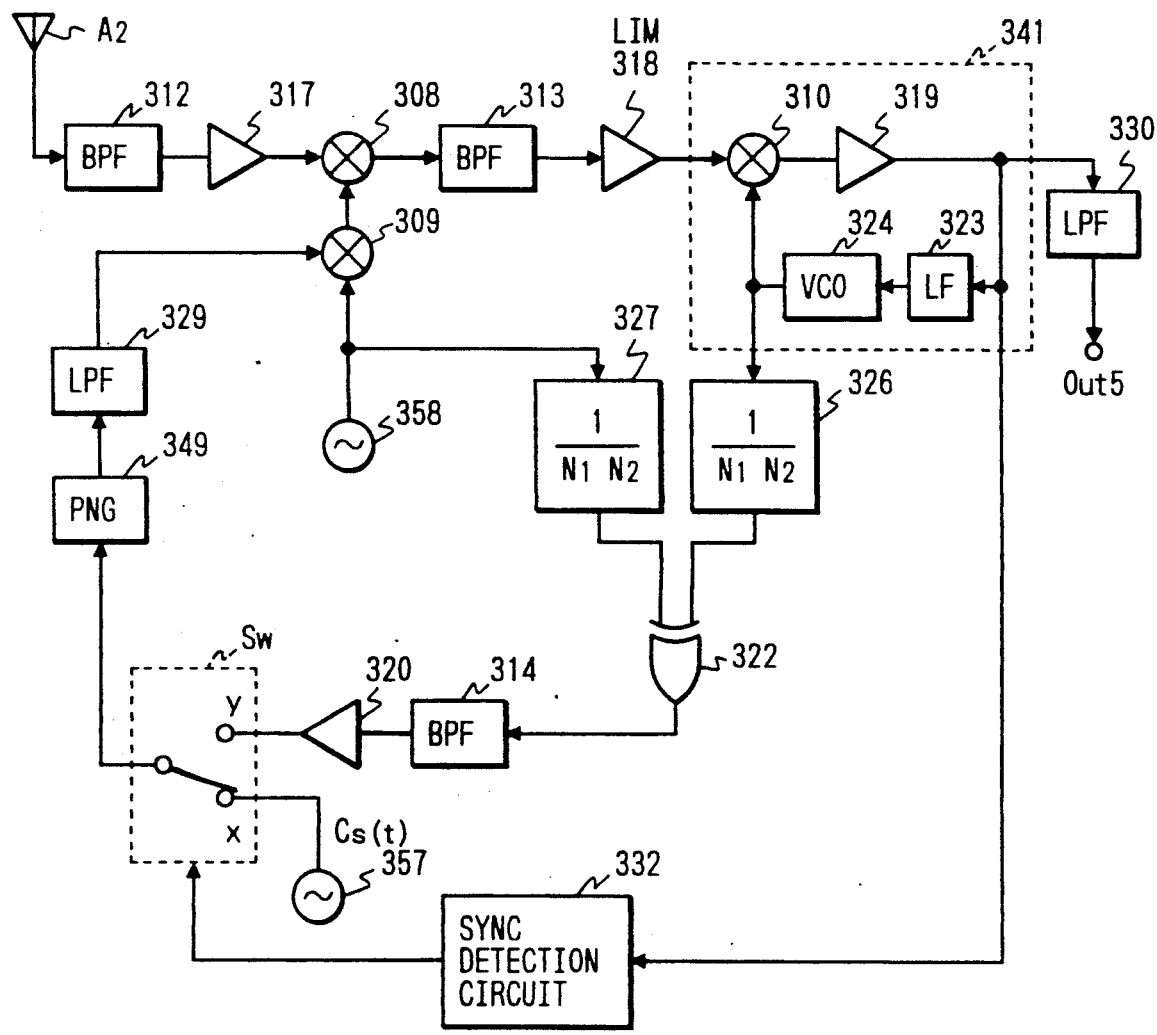
FIG. 7(B) is a schematic block diagram showing a receiver of the SS modulation/demodulation system in accordance with the fourth embodiment of the present invention.

A fourth embodiment of the spread spectrum modulation/demodulation system in accordance with the present invention is explained with reference to FIGS. 7(A) and 7(B). FIG. 7(A) shows a transmitter, while FIG. 7(B) shows a receiver.

In FIG. 7(A), an intelligence signal S(t) is supplied to an angle modulation circuit 352 through an input terminal In5. The angle modulation circuit 352 modulates a carrier, which is fed from its accommodating oscillator, with this intelligence signal S(t), and generates an angle-modulated signal fm(t) as a primary modulation signal. Here, a frequency, an instantaneous frequency of the angle-modulated signal fm(t) in strictly saying, is fm.

The angle-modulated signal fm(t) is supplied to a multiplied-by-$N_1$ circuit 353, an output of which is a angle-modulated signal f(t).

The angle-modulated signal fm(t) is also supplied to a divided-by-$N_1$ circuit 328, which generates an output having a center frequency of $fm/N_2$. This output is supplied to a spread code generator (PNG) 348 as a clock signal C(t) having a frequency of fc. In response to this clock signal C(t) having a frequency of fc. In response to this clock signal C(t), the PNG 348 produces a spread code P(t). Through an LPF 331, this spread code P(t) is supplied to a mixer 306, in which the spread spectrum operation is carried out by use of this spread code P(t) and the angle-modulated signal f(t).

Thus, the mixer 306 generates an SS modulated signal SS(t) of P(t)*f(t), which is thereafter amplified by an amplifier 316 and outputted through an antenna A1.

Next, in the receiver of FIG. 7(B), the SS modulated signal SS(t), received by an antenna A2, is supplied to a mixer 308 through a BPF 312 and an amplifier 317. The BPF 312 removes unnecessary frequency components, and the amplifier 317 is a high-frequency amplifier. Though the SS modulated signal SS(t) is expressed in the same form, it may include noise components when received by the antenna A2.

A local oscillator 358 supplies a local oscillation signal to a mixer 309. The mixer 309 multiplies this local oscillation signal with a spread code supplied from a PNG 349 through an LPF 329, and generates a spread code of an intermediate frequency as a result of the beat-down operation.

The mixer 308 inputs this spread code of an intermediate frequency, and multiplies it with the SS modulated signal SS(t) so as to carry out the despreading operation.

An oscillator 357 produces a clock signal Cs(t), a frequency of which is fs. There is a slight difference δf between this frequency fs and the frequency fc of the regular clock signal C(t). That is, fs=fc±δf.

This clock signal Cs(t) is supplied to the PNG 349 through a switching circuit Sw. The PNG 349 produces the spread code $\rho(t)$ on the basis of this clock signal Cs(t), and outputs it to the mixer 309 through the LPF 329.

As the local oscillator 358 feeds the local oscillation signal $f_L(t)$ to the mixer 309, an output of the mixer 309 becomes $\rho(t)*f_L(t)$. The mixer 308 inputs this signal $\rho(t)*f_L(t)$, and outputs a signal $SS(t)*\rho(t)*f_L(t)$. A BPF 313 transmits a signal having an intermediate-frequency. Through this BPF 313, an intermediate frequency signal $f_{SI}(t)$ is obtained. A frequency of this IF signal $f_{SI}(t)$ is expressed, for example, as $Nfm - f_L$.

The IF signal $f_{SI}(t)$ is supplied to a limiting amplifier 318 and then to a phase detector 310. The phase detector 310 constitutes the phase-locked loop (PLL) 341, together with an amplifier 319, an LF 323, and a VCO 324. As an output of the VCO 324, the PLL 341 generates a signal synchronous with instantaneous frequency fi of the IF signal $f_{SI}(t)$. This signal is supplied to a divided-by-$N_1N_2$ circuit 326 and to the phase detector 310.

The local oscillator 358 supplies the local oscillator signal $f_L(t)$ to a divided-by-$N_1N_2$ circuit 327, so that the local oscillator signal $f_L(t)$ is divided by into $1/N_1N_2$. As a result, a fundamental frequency signal $f_L/(N_1N_2)$ is fed to one input terminal of an EX-OR circuit 322. In the same manner, the output signal of the divided-by-$N_1N_2$ circuit 326 is fed to the other input terminal of the EX-OR circuit 322. The EX-OR circuit 322 generates a multiplication value of these input values. Therefore, this EX-OR circuit 322 can be substituted by a mixer.

A BPF 314 selects the frequency component of $(fi+f_L)/(N_1N_2)$. An amplifier 320 amplifies it, and further sends it to the switching circuit Sw.

As the frequency of the SS modulated signal SS(t) is $N_1*fm$, a frequency of the output frequency $(fi+f_L)/(N_1N_2)$ is expressed by $fm/N_2$.

This value $fm/N_2$ is equivalent to the frequency of the divided-by-$N_2$ circuit 328. It means that this is equivalent to a clock signal supplied to the PNG 348 when the SS synchronous condition is established.

The synchronous time is detected by a sync detection circuit 332 in the same manner as previous embodiments. The sync detection circuit 332 supplies a control signal to the switching circuit Sw. That is, once the synchronous condition is detected, a movable contact of the switching circuit Sw is changed over from x-terminal to y-terminal.

After the movable contact is connected to the y-terminal, the spread code generated from the PNG 349 is changed from $\rho(t)$ to P(t). The spread code P(t) is supplied to the mixer 309 through the LPF 329. The mixer 309 multiplies this spread code P(t) with the local oscillation signal. An output $P(t)*f_L(t)$ of the mixer 309 is entered into one input terminal of the mixer 308. The mixer 308 executes a despreading demodulation on the basis of the SS modulated signal SS(t) and the output $P(t)*f_L(t)$, and produces an intermediate frequency signal $f_I(t)$. This IF signal $f_I(t)$ is supplied to the phase detector 310 of the PLL 341 through the BPF 313 and the limiting amplifier 318.

In the PLL 341, the angle demodulation is adequately performed. After that, unnecessary frequency components are removed in a LPF 330. And finally, demodulated intelligence signal S'(t) is obtained from an output terminal Out5.

Modification 1

Next, a modification of the receiver shown in FIG. 7(B) will be described with reference to FIG. 8. The same components as those of FIG. 7(B) are suffixed by the same reference numerals.

Figure 8:
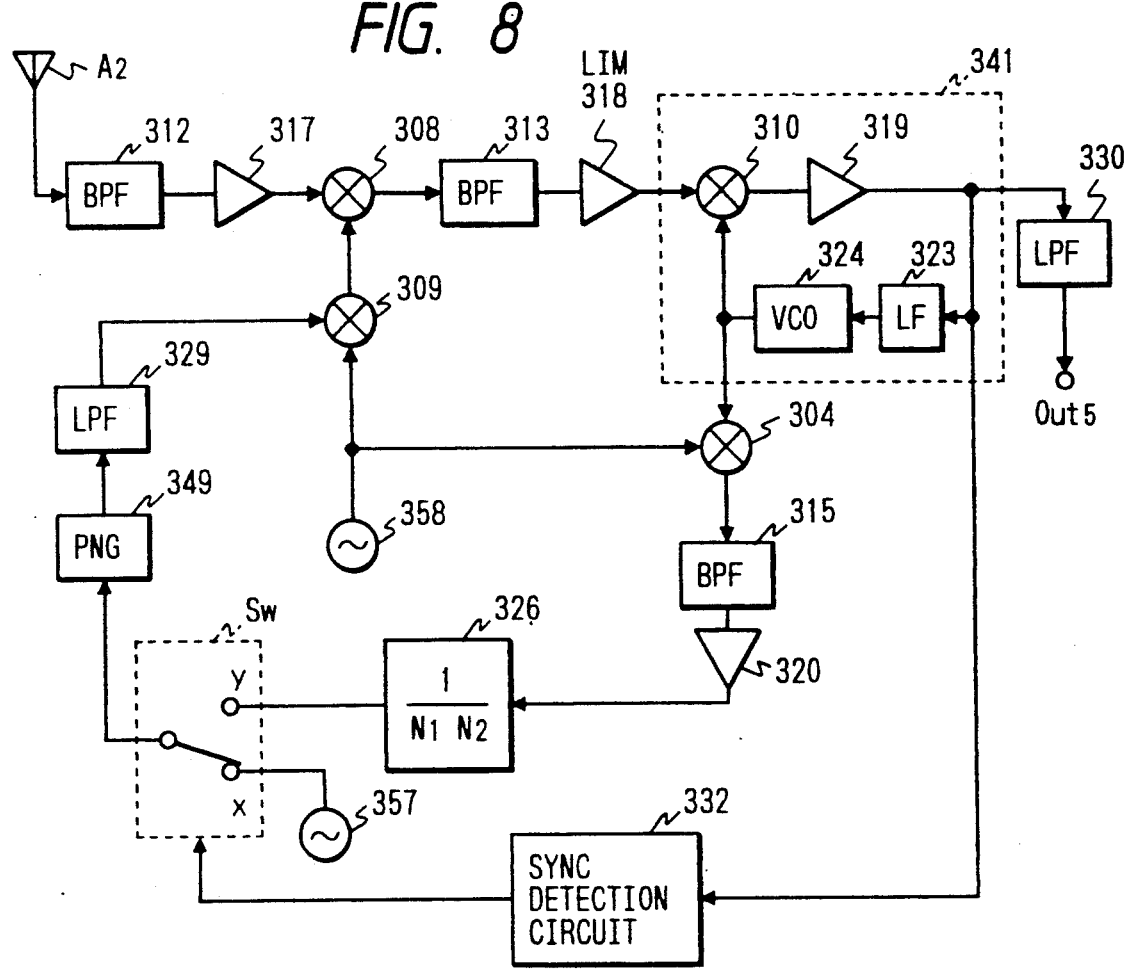

In FIG. 8, there is provided a mixer 304. The VCO 324 feeds its output fi to one input terminal of the mixer 304, while the local oscillator 358 feeds the local oscillation signal $f_L$ to the other input terminal of the mixer 304. A BPF 315 transmits a signal of $(f_L+fi)$ to an amplifier 320. The divided-by-$N_1N_2$ circuit 326 inputs the signal $(f_L+fi)$ and produces a signal having a fundamental frequency of $(f_L+fi)/(N_1N_2)$.

In accordance with this modified circuit, one divided-by-$N_1N_2$ circuit 327 can be eliminated and therefore the circuit configuration can be simplified.

Modification 2

Furthermore, another modification of the receiver will be described with reference to FIG. 9. The same components as those of FIG. 7(B) or FIG. 8 are suffixed by the same reference numerals.

In FIG. 9, the local oscillator 358 causes a local oscillation signal having a frequency equivalent to $1/N_2$ of that of the local oscillator in the previous examples of FIGS. 7(B) and 8. Instead, there is provided a multiplied-by-$N_2$ circuit 333 between the local oscillator 358 and the mixer 309.

A synchronous time detecting operation will be explained hereinafter. In the same manner as in the previous examples, the oscillator 357 produces a clock signal Cs(t), a frequency of which is fs. There is a slight difference δf between this frequency fs and the frequency fc of the regular clock signal C(t). That is, fs=fc±δf.

The clock signal Cs(t) is supplied to the PNG 349 through the switching circuit Sw. The PNG 349 produces the spread code ρ(t) on the basis of this clock signal Cs(t), and outputs it to the mixer 309 through the LPF 329.

As the local oscillator 358 feeds the local oscillation signal $f_L'(t)$ to the multiplied-by-$N_2$ circuit 333. The mixer 309 inputs the output of the multiplied-by-$N_2$ circuit 333, and generates an output of $\rho(t)*P(t)*N_2*f_L'(t)$. The BPF 313 selects an intermediate-frequency signal $f_{Sr}(t)$ having a center frequency of, for example, $N_1fm-N_2f_L'$, from this output.

The IF signal $f_{Sr}(t)$ is supplied to the limiting amplifier 318 and then to the phase detector 310. As an output of the VCO 324, the PLL 341 generates a signal synchronous with instantaneous frequency fi of the IF signal $f_{Sr}(t)$. This signal is supplied to the divided-by-$N_1N_2$ circuit 326 and to the phase detector 310. A frequency of this signal is $N_1fm-N_2f_L'$.

The local oscillator 358 supplies the local oscillator signal $f_L'$ to the divide-by-$N_1$ circuit 325, so that the local oscillator signal $f_L'$ is divided by into $1/N_1$. As a result, a fundamental frequency signal $f_L'/N_1$ is fed to one input terminal of the EX-OR circuit 322.

On the other hand, a frequency of the VCO 324 is converted into $(N_1fm-N_2f_L')/N_1N_2$ through the divided-by-$N_1N_2$ circuit 326. The output signal of the divided-by-$N_1N_2$ circuit 326 is fed to the other input terminal of the EX-OR circuit 322.

The EX-OR circuit 322 generates a multiplication value of these input values. (This EX-OR circuit 322 can be substituted by a mixer). The BPF 315 selects the modulated frequency component having a center frequency of $(N_1fm-N_2f_L')/N_1N_2+f_L'/N_1$ $(=fm/N_2)$. The amplifier 320 amplifies it, and further sends it to the switching circuit Sw.

As is explained previously, a fundamental frequency of the output of the amplifier 320 is $fm/N_2$. This value $fm/N_2$ is equivalent to the fundamental dividing frequency of the divided-by-$N_2$ circuit 328 in the transmitter. It means that this is equivalent to a clock signal supplied to the PNG 348 when the SS synchronous condition is established.

The synchronous time is detected by a sync detection circuit 332 in the same manner as previous embodiments. The sync detection circuit 332 supplies a control signal to the switching circuit Sw. That is, once the synchronous condition is detected, the movable contact of the switching circuit Sw is changed over from x-terminal to y-terminal. After the movable contact is connected to the y-terminal, the spread code generated from the PNG 349 is changed from ρ(t) to P(t).

This spread code P(t) is supplied to the mixer 309 through the LPF 329. The mixer 309 multiplies this spread code P(t) with the multiplied local oscillation signal $f_L'$ supplied from the multiplied-by-$N_2$ circuit 333. An output $P(t)*f_L'(t)$ of the mixer 309 is entered into one input terminal of the mixer 308. The mixer 308 executes a despreading demodulation on the basis of the SS modulated signal SS(t) and the output $P(t)*f_L'(t)$, and produces an intermediate frequency signal $f_I'(t)$. This IF signal $f_I'(t)$ is supplied to the phase detector 310 of the PLL 341 through the BPF 313 and the limiting amplifier 318.

In the PLL 341, the angle demodulation is adequately performed. After that, unnecessary frequency components are removed in the LPF 330. And finally, demodulated intelligence signal S'(t) is obtained from the output terminal Out5.

By the way, the multiplied-by-$N_2$ circuit 333 can be replaced by a multiplied-by-$N_1$ circuit if the divided-by-$N_1$ circuit 325 is simultaneously replaced by a divided-by-$N_2$ circuit. In this case, it is needless to say that the local oscillator 358 must cause a local oscillation signal having a frequency equivalent to $1/N_1$ of that of the local oscillator in the previous examples of FIGS. 7(B) and 8.

Modification 3

Furthermore, still another modification of the receiver will be described with reference to FIG. 10. The same components as those of FIG. 7(B), FIG. 8 and FIG. 9 are suffixed by the same reference numerals.

In FIG. 10, the local oscillator 358 cause a local oscillation signal having a frequency equivalent to $1/N_1$ of that of the local oscillator in the previous examples of FIGS. 7(B) and 8. A multiplied-by-$N_1$ circuit 353 is provided between the local oscillator 358 and the mixer 309, so that the frequency $f_L$ of the local oscillation signal is multiplied by $N_1$. A divided-by-$N_1$ circuit 325 receives an output of the VCO 324 and supplies it into one input terminal of the EX-OR circuit 322. The local oscillator 358 supplies its oscillation signal to the other input terminal of the EX-OR circuit 322.

An output of the EX-OR circuit 322 is supplied through the BPF 315 and the amplifier 320 to the divided-by-$N_2$ circuit 328. The remainder of this circuit is the same as the example of FIG. 9.

Fifth Embodiment

Figure 11A:
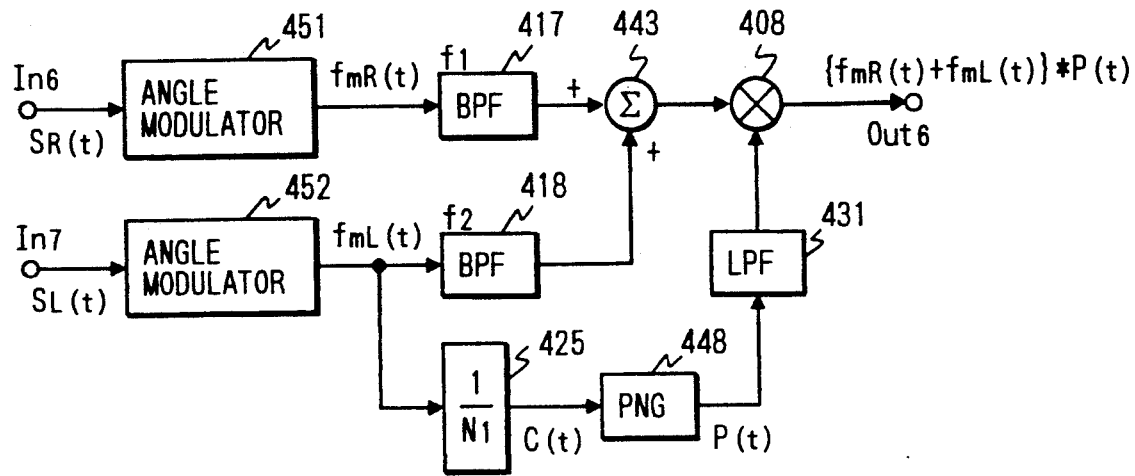
FIG. 11(A) is a schematic block diagram showing a transmitter of the SS modulation/demodulation system in accordance with a fifth embodiment of the present invention.
Figure 11B:
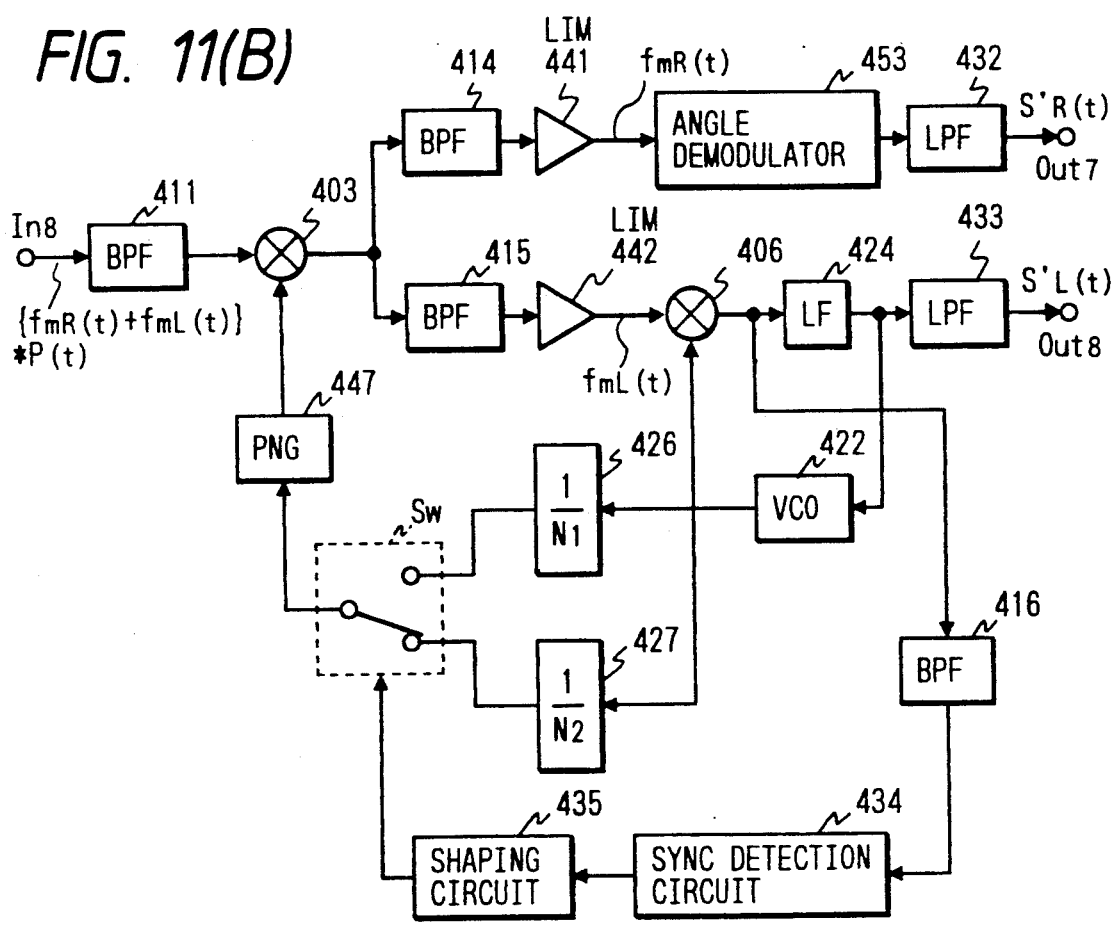
FIG. 11(B) is a schematic block diagram showing a receiver of the SS modulation/demodulation system in accordance with the fifth embodiment of the present invention.

A fifth embodiment of the spread spectrum modulation/demodulation system in accordance with the present invention is explained with reference to FIGS. 11(A), 11(B), 12, and 13. FIG. 11(A) shows a transmitter, while FIG. 11(B) shows a receiver.

Figure 12A:
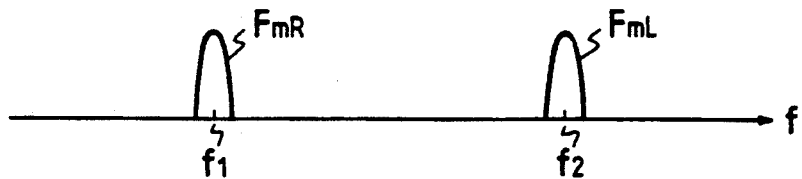
FIGS. 12(A) and 12(B) show the angle-modulated signals and spectrums in the fifth embodiment.

In FIG. 11(A), intelligence signals $S_R(t)$, $S_L(t)$ are supplied from input terminals In6, In7 to angle modulators 451, 452. Angle-modulated signals $fm_R(t)$, $fm_L(t)$ are generated from the angle modulator 451, 452, respectively. FIG. 12(A) shows these angle-modulated signals $fm_R(t)$, $fm_L(t)$. A carrier frequency f1 of the angle-modulated signals $fm_R(t)$ is different from a carrier frequency f2 of the angle-modulated signals $fm_L(t)$. These angle-modulated signals $fm_R(t)$, $fm_L(t)$ are supplied to a BPF 417 and a BPF 418, respectively, and added in an adder 443. An output of this adder 443 is fed to one input terminal of a mixer 408.

The angle-modulated signal $fm_L(t)$ is also supplied to a divided-by-$N_1$ circuit 425, through which a clock signal C(t) is produced by dividing the frequency of the angle-modulated signal $fm_L(t)$. A spread code generator (PNG) 448 inputs this clock signal C(t) and generates a spread code P(t). It is needless to say that this spread code P(t) has synchronous relationship with the carrier of the angle-modulated signal $fm_L(t)$. Thus obtained spread code P(t) is supplied through an LPF 431 to the other input terminal of a mixer 408.

The mixer 408 multiplies the spread code P(t) with the output of the adder 443, and then outputs an SS modulated signal $\{fm_R(t)+fm_L(t)\}*P(t)$ through an output terminal Out6 as a result of frequency division multiplex operation.

Figure 12B:

In FIG. 12(B), spectrums $SS_R$ and $SS_L$ correspond respectively to $fm_R(t)*P(t)$ and $fm_L(t)*P(t)$.

Next, in FIG. 11(B), thus transmitted SS modulation signal $\{fm_R(t)+fm_L(t)\}*P(t)$ is inputted through an input terminal In8. This SS modulation signal $\{fm_R(t)+fm_L(t)\}*P(t)$ is sent through a BPF 411 to one input terminal of a mixer 403.

The PNG 447 supplies a spread code $\rho(t)$ to the other input terminal of the mixer 403. The mixer 403 multiplies this spread code $\rho(t)$ with the SS modulation signal and generates an output of $\{fm_R(t)+fm_L(t)\}*P(t)*\rho(t)$. This output corresponds to the spreading condition before SS synchronous condition is established.

If the SS synchronous condition has once established, the demodulation noise level of the PLL (phase detector 406, LF 426, VCO 422) is lowered. A BPF 416 transmits noise components, whose frequencies are slightly higher than that of the intelligence signal, to a sync detection circuit 434. On the basis of the judgement of the synchronous time, the sync detection circuit 434 outputs a control signal to a shaping circuit 435. In response to this control signal, the shaping circuit 435 feeds a changeover signal to the switching circuit Sw, so as to connect a movable contact of the switching circuit Sw to an output terminal of a divided-by-$N_1$ circuit 426 from an output terminal of a divided-by-$N_2$ circuit 427.

The divided-by-$N_1$ circuit 426 has the same dividing number as the divided-by-$N_1$ circuit 425 used in the modulation stage of the transmitter. It means that the divide-by-$N_1$ circuit 426 can generate a clock signal C(t) which is equal to that of the divided-by-$N_1$ circuit 425 in both frequency and phase.

This clock signal C(t) is supplied to the PNG 447, thereby obtaining the spread code P(t). By inputting this spread code P(t) into the mixer 403, the despreading process is taken place therein.

Accordingly, the despreading output becomes $\{fm_R(t)+fm_L(t)\}*P(t)*P(t)$. As is well known, $P^2(t)$ equal to 1 (i.e. direct current). Therefore, an output of a BPF 414 becomes $fm_R(t)$ and an output of a BPF 415 becomes $fm_L(t)$.

The output of the BPF 414 is supplied through a limiting amplifier 441 to an angle demodulator 453, in which the primary demodulation (angle demodulation) is carried out. As an output of the angle demodulator 453, a demodulated intelligence signal $S_R(t)$ is fed to an LPF 432 and outputted from an output terminal Out7.

The output of the BPF 415 is supplied through a limiting amplifier 442 to the phase detector 406 in the PLL, and compared with the output of the VCO 422. The compared result is supplied to the LF 424, whose output is sent to an LPF 433 and the VCO 422. Accordingly, a demodulated intelligence signal is obtained from the LPF 433 and outputted from an output terminal Out8.

Here, the output of the VCO 422 is synchronous with the carrier of the angle-modulated signal $fm_L(t)$ inputted into the phase detector 406. Accordingly, an output of the divided-by-$N_1$ circuit 426 becomes a clock signal equivalent to the clock signal C(t) for the PNG 448 in the transmitter. Thus, the PNG 447 produces the spread code P(t) in response to this clock signal. By the way, the PLL (phase detector 406, LF 424, and VCO 422) has the same demodulation characteristics as the angle demodulator 453.

Modification 1

Figure 13:
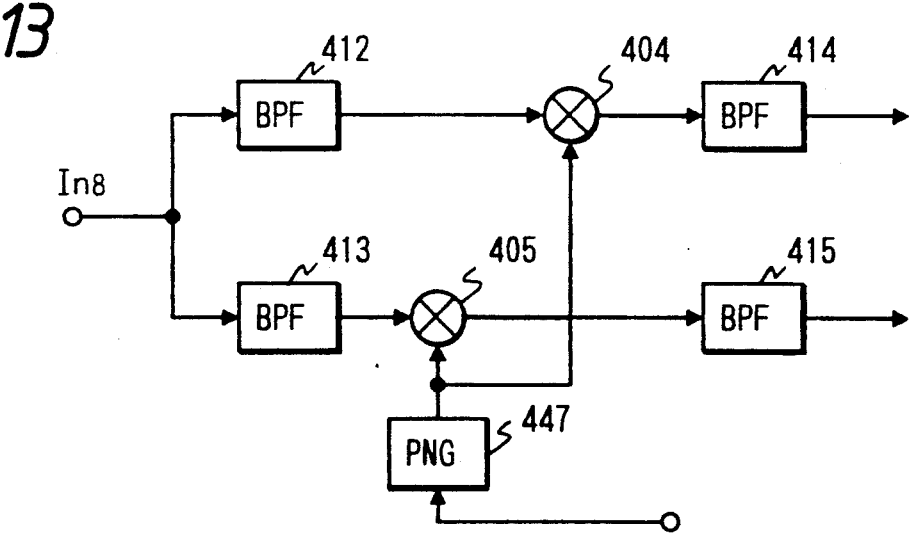
FIG. 13 shows a modification of the demodulation portion of the fifth embodiment.
Figure 14:
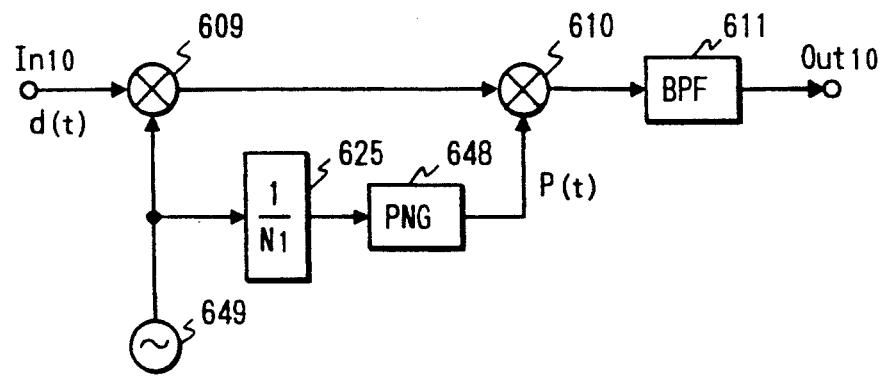
FIG. 14 is a schematic block diagram showing a typical transmitter of the SS modulation/demodulation system.
Figure 15:
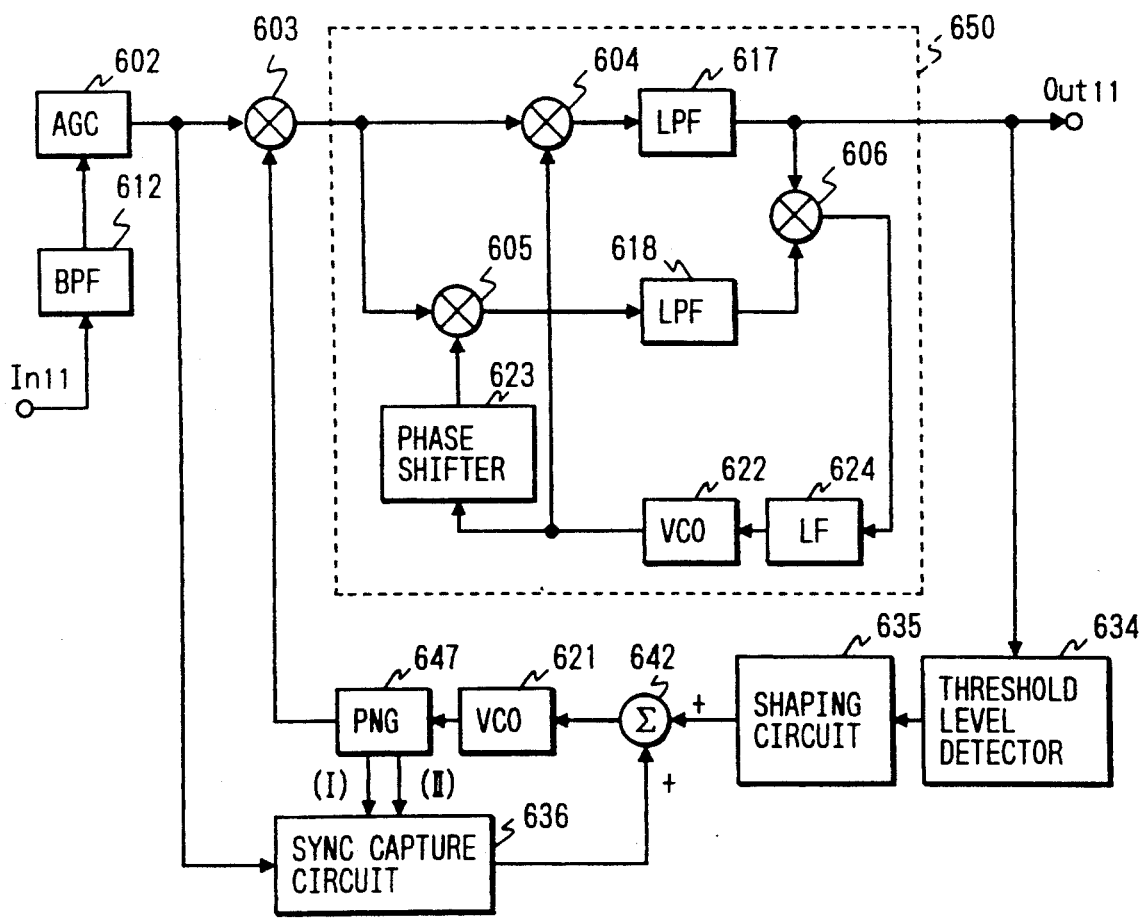
FIG. 15 is a schematic block diagram showing a typical receiver of the SS modulation/demodulation system.
Figure 16:
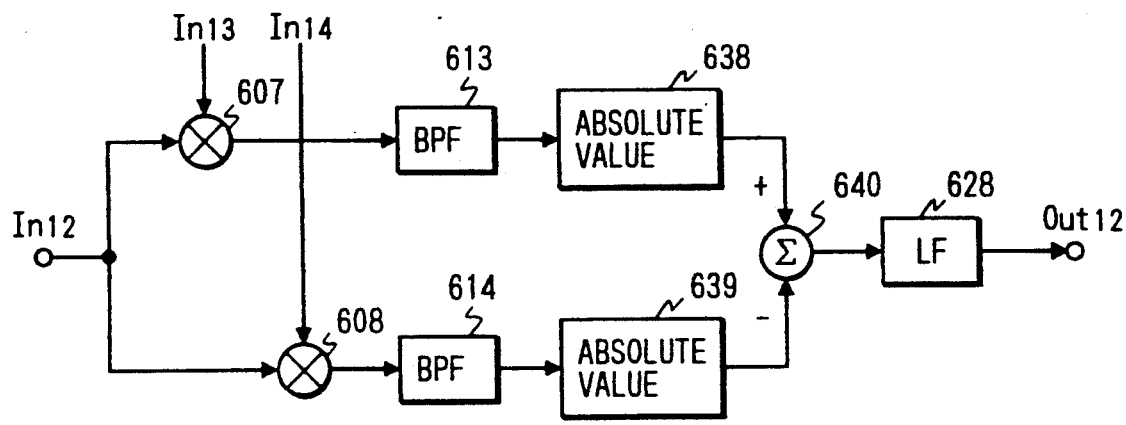
FIG. 16 is a schematic diagram showing a detailed construction of the DLL-type sync capture circuit of the receiver shown in FIG. 15.
Figure 17:
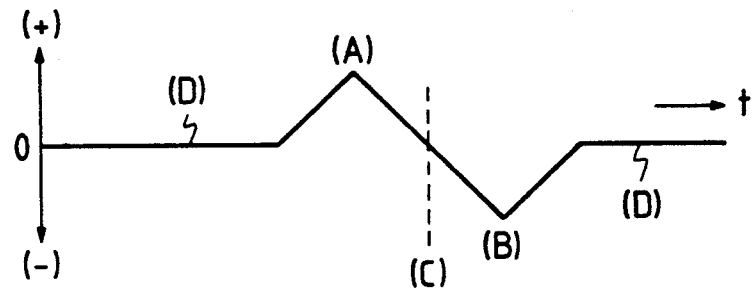
FIG. 17 is a graph showing the control characteristics of the control loop in the receiver of FIG. 15; and, FIG. 18 is a graph showing the steep increase in the level of the demodulation output.
Figure 18:
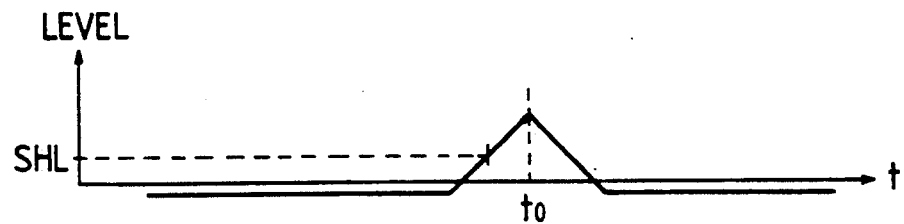

FIG. 13 shows a modification of the demodulation portion in this embodiment.

In this modification, SS modulation signal $\{fm_R(t)+fm_L(t)\}*P(t)$ is supplied to a BPF 412 and a BPF 413. The BPF 412 transmits the component $fm_R(t)*P(t)$, while the BPF 413 transmits the component $fm_L(t)*P(t)$.

A mixer 404 multiplies the output signal of the BPF 412 with the spread code $\rho(t)$ of the PNG 447 so as to feed an output $fm_R(t)*P(t)*\rho(t)$ to the BPF 414. In the same manner, a mixer 405 multiplies the output signal of the BPF 413 with the spread code $\rho(t)$ of the PNG 447 so as to feed an output $fm_L(t)*P(t)*\rho(t)$ to the BPF 415. The remainder of the circuit is the same as the example of FIG. 11(B).

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A transmitter for a spread spectrum communication system comprising:
    an angle modulation means for performing angle modulation of intelligence signals;

a frequency divider for receiving an angle-modulated signal outputted from said angle modulation means and dividing the frequency of this angle-modulated signal by a first dividing number to generate a modulation clock signal;

a spread code generating means for producing a spread code on the basis of said modulation clock signal; and a spread spectrum modulation means for modulating said angle-modulated signal by said spread code to output a spread spectrum modulation signal.

2. A transmitter for a spread spectrum communication system comprising:

an angle modulator for performing angle modulation of intelligence signals with a carrier having a predetermined carrier frequency so as to generate an angle-modulated signal;

a first local oscillator for outputting a local oscillation signal having a frequency different from said carrier frequency;

a first frequency multiplier for multiplying the frequency of said local oscillation signal with a multiple number $N_1$;

a first mixer for multiplying said angle-modulated signal with said multiplied-by-$N_1$ local oscillation signal so as to perform up-conversion;

a first frequency divider for dividing said angle-modulated signal into $1/N_1$ to obtain a first divided angle-modulated signal;

a second mixer for multiplying an output of said first frequency divider with said local oscillation signal to perform up-conversion;

a second frequency divider for dividing an output of said second mixer into $1/N_2$ to obtain a second divided angle-modulated signal;

a first spread code generator for generating a spread code by using said second divided angle-modulated signal as a modulation clock signal; and a third mixer for multiplying an output of said first mixer with said spread code to output a spread spectrum modulation signal.

3. A transmitter for a spread spectrum communication system comprising:

an angle modulator for performing angle modulation of intelligence signals with a carrier having a predetermined carrier frequency so as to generate an angle-modulated signal;

a first frequency divider for dividing said angle-modulated signal into $1/N_1$ to obtain a first divided angle-modulated signal;

a first local oscillator for outputting a local oscillation signal having a frequency different from said carrier frequency;

a first frequency multiplier for multiplying the frequency of said local oscillation signal with a multiple number $N_1$;

a first mixer for multiplying said first divided angle-modulated signal with said local oscillation signal so as to perform up-conversion;

a second frequency divider for dividing an output of said first mixer into $1/N_2$ to obtain a second divided angle-modulated signal;

a first spread code generator for generating a spread code by using said second divided angle-modulated signal as a modulation clock signal;

a second mixer for multiplying said spread code with said multiplied-by-$N_1$ local oscillation signal to obtain a carrier-modulated spread code; and a third mixer for multiplying said carrier-modulated spread code with said angle-modulated signal to output a spread spectrum modulation signal.

4. A transmitter for a spread spectrum communication system comprising:

an angle modulation means for performing angle modulation of intelligence signals;

a frequency multiplier for multiplying an angle-modulated signal outputted from said angle modulation means with a multiple number $N_1$;

a frequency divider for dividing said angle-modulated signal by a dividing number $N_2$ to generate a modulation clock signal;

a spread code generating means for producing a spread code on the basis of said modulation clock signal; and a spread spectrum modulation means for modulating said angle-modulated signal outputted from said frequency multiplier by said spread code to output a spread spectrum modulation signal.

5. A transmitter for a spread spectrum communication system comprising:

a plurality of primary modulation means for performing angle modulation of intelligence signals and outputting a plurality of angle-modulated signals;

an adder means for adding said plurality of angle-modulated signals to generate a frequency division multiplex signal;

a frequency divider for generating a clock signal by using either of said plurality of angle-modulated signals;

a spread code generating means for generating a spread code on the basis of said clock signal; and a spread spectrum modulation means for modulating said multiplex signal with said spread code to output a spread spectrum modulation signal.

6. A receiver for receiving and demodulating signals generated by the transmitter of claim 1, comprising:

a despreading means for receiving said spread spectrum modulation signal and despreading it by a demodulation spread code;

an angle demodulation means for generating a demodulation output by means of a phase-locked loop circuit contained therein, which performs angle demodulation of a despreading signal outputted from said despreading means;

a sync detection means for detecting sync condition on the basis of noise level of a phase detector provided in said phase-locked loop circuit, and generating a sync detection signal when sync condition is established; and a clock signal generating means for responding said sync detection signal to switch a demodulation clock signal of said demodulation spread code between a temporary clock used for capturing a sync time and a regular clock which is equivalent to said modulation clock signal used in said transmitter.

7. A receiver for receiving and demodulating signals generated by the transmitter of claim 1 comprising:

a despreading means for receiving said spread spectrum modulation signal and despreading it by a demodulation spread code;

an angle demodulation means for generating a demodulation output by means of a phase-locked loop circuit contained therein, which performs angle demodulation of a despreading signal outputted from said despreading means;

an sync detection means for detecting sync condition on the basis of noise level of a phase detector provided in said phase-locked loop circuit, and generating a sync detection signal when sync condition is established; and a clock signal generating means for responding said sync detection signal to switch a demodulation clock of said demodulation spread code between first and second values so as to change said demodulation spread code, said first value being obtained by dividing an output of a voltage-controlled oscillator provided in said phase-locked loop circuit by said first dividing number, and said second value being obtained by dividing the output of the voltage-controlled oscillator by a second dividing number which is slightly different from said first dividing number.

8. A receiver for receiving and demodulating signals generated by the transmitter of claim 1, comprising:

a despreading means for receiving said spread spectrum modulation signal and despreading it by a multiplication output of a demodulation spread code and an oscillation output of a local oscillator, so as to produce an despreading signal of an intermediate-frequency;

an angle demodulation means for generating a demodulation output by means of a phase-locked loop circuit contained therein, which performs angle demodulation of said despreading signal outputted from said despreading means;

a beat-up means for multiplying an output of voltage-controlled oscillator provided in said phase-locked loop circuit with said oscillation output of said local oscillator so as to generate a beat-up output;

a secondary frequency divider for generating two divided outputs by dividing said beat-up output by said first dividing number and a second dividing number being different from said first dividing number, respectively;

a sync detection means for detecting sync condition on the basis of noise level of a phase detector provided in said phase-locked loop circuit, and generating a sync detection signal when sync condition is established; and a clock signal generating means for responding said sync detection signal to switch a demodulation clock between said two divided outputs of said second frequency divider so as to change said demodulation spread code.

9. A receiver for receiving and demodulating signals generated by the transmitter of claim 2, comprising:

a despreading circuit for receiving said spread spectrum modulation signal and despreading it by a demodulation spread code to perform despreading demodulation;

a second local oscillator for outputting a local oscillation signal having the same frequency as said first local oscillator;

a second frequency multiplier for multiplying the frequency of the local oscillation signal of said second local oscillator with the multiple number $N_1$;

a fourth mixer for multiplying an output of said despreading circuit with an output of said second frequency multiplier to perform down-conversion;

an angle demodulator of a phase-locked loop type for generating an angle-demodulated output on the basis of an output of said fourth mixer;

a third frequency divider for dividing an output of a voltage-controlled oscillator provided in said angle demodulator into $1/N_1$;

a fifth mixer for multiplying an output of said third frequency divider with said local oscillation signal of said second local oscillator to perform up-conversion;

fourth and fifth frequency dividers for dividing an output of said fifth mixer into $1/N_2$ and $1/N_3$, respectively;

a sync detection circuit for detecting sync condition on the basis of noise level of a phase detector provided in said angle demodulator and generating a sync detection signal when sync condition is established;

a switching circuit for alternatively selecting either of said fourth and fifth frequency dividers in response to said sync detection signal as a demodulation clock signal; and a second spread code generator for producing said demodulation spread code on the basis of said demodulation clock signal.

10. A receiver for receiving and demodulating signals generated by the transmitter of claim 3, comprising:

a despreading circuit for receiving said spread spectrum modulation signal and despreading it by a demodulation spread code to perform despreading demodulation;

a second local oscillator for outputting a local oscillation signal having the same frequency as said first local oscillator;

a second frequency multiplier for multiplying the frequency of the local oscillation signal of said second local oscillator with the multiple number $N_1$;

a fourth mixer for multiplying an output of said despreading circuit with an output of said second frequency multiplier to perform down-conversion;

an angle demodulator of a phase-locked loop type for generating an angle-demodulated output on the basis of an output of said fourth mixer;

a third frequency divider for dividing an output of a voltage-controlled oscillator provided in said angle demodulator into $1/N_1$;

a fifth mixer for multiplying an output of said third frequency divider with said local oscillation signal of said second local oscillator to perform up-conversion;

fourth and fifth frequency dividers for dividing an output of said fifth mixer into $1/N_2$ and $1/N_3$, respectively;

a sync detection circuit for detecting sync condition on the basis of noise level of a phase detector provided in said angle demodulator and generating a sync detection signal when sync condition is established;

a switching circuit for alternatively selecting either of said fourth and fifth frequency dividers in response to said sync detection signal as a demodulation clock signal; and a second spread code generator for producing said demodulation spread code on the basis of said demodulation clock signal.

11. A receiver for receiving and demodulating signals generated by the transmitter of claim 4, comprising:

a local oscillator for outputting a local oscillation signal;

a frequency converter means for converting a frequency of a demodulation spread code into an intermediate frequency by using said local oscillation signal;

a despreading means for multiplying said demodulation spread code converted into an intermediate-frequency with a spread spectrum modulation signal to obtain a despreading signal;

a phase-locked loop means for generating an angle-demodulated signal on the basis of said despreading signal;

a clock signal generating means for generating a demodulation clock signal on the basis of an output of a voltage-controlled oscillator provided in said phase-locked loop means and said local oscillation signal of said local oscillator;

a demodulation spreading code generating means for producing said demodulation spread code on the basis of said demodulation clock signal obtained by said clock signal generating means; and a sync capture means for generating a control signal on the basis of said angle-demodulated signal so as to capture sync condition during spread spectrum demodulation.

12. A receiver in accordance with claim 11, wherein said clock signal generating means for generating a demodulation clock signal includes a first frequency divider for dividing said local oscillation signal of said local oscillator into $1/(N_1N_2)$, a second frequency divider for dividing said output signal of said voltage-controlled oscillator into $1/(N_1N_2)$, a calculating means for obtaining a multiplication value or an EX-OR value of two outputs of said first and second frequency dividers, and a band pass filter for receiving an output of said calculating means and transmitting only frequency components necessary for generating said demodulation clock signal.

13. A receiver in accordance with claim 11, wherein said clock signal generating means for generating a demodulation clock signal includes a multiplier for multiplying said local oscillation signal of said local oscillator and said output signal of said voltage-controlled oscillator, a band pass filter for receiving an output of said multiplier and transmitting only frequency components necessary for generating said modulation clock signal, and a frequency divider for dividing an output of said band pass filter into $1/(N_1N_2)$.

14. A receiver in accordance with claim 11, wherein said clock signal generating means for generating a demodulation clock signal includes a first frequency divider for dividing said local oscillation signal of said local oscillator into $1/N_1$ or $1/N_2$, a second frequency divider for dividing said output signal of said voltage-controlled oscillator into $1/(N_1N_2)$, a calculating means for obtaining a multiplication value or an EX-OR value of two outputs of said first and second frequency dividers, and a band pass filter for receiving an output of said calculating means and transmitting only frequency components necessary for generating and demodulation clock signal, and said local oscillator is associated with a frequency multiplier having a multiple number $N_1$ or $N_2$, so that said local oscillation signal can be supplied from said local oscillator to said frequency converter through this frequency multiplier.

15. A receiver in accordance with claim 11, wherein said clock signal generating means for generating a demodulation clock signal includes a first frequency divider for dividing said output signal of said voltage-controlled oscillator into $1/N_1$, a calculating means for obtaining a multiplication value or an EX-OR value of an output of said first frequency divider and said local oscillation signal of said local oscillator, a band pass filter for receiving an output of said calculating means and transmitting only frequency components necessary for generating said demodulation clock signal, and a second frequency divider for dividing an output of said band pass filter into $1/N_2$, and said local oscillator is associated with a frequency multiplier having a multiple number $N_1$, so that said local oscillation signal can be supplied from said local oscillator to said frequency converter through this frequency multiplier.

16. A receiver in accordance with claim 11, further comprises a sync capture signal generating means for generating a sync capture signal having a frequency slightly different from that of said demodulation clock signal, and a switching means for switching the signal to be supplied to said demodulation spread code generator from said sync capture signal to said modulation clock signal when sync condition is established.

17. A receiver for receiving and demodulating signals generated by the transmitter of claim 5, comprising:

a despreading means for receiving said spread spectrum modulation signal and despreading it by a demodulation spread code;

a plurality of band pass filters for separating a plurality of angle-modulated signals from an output of said despreading means;

a first angle demodulation means for generating a demodulation output by means of a phase-locked loop circuit contained therein, which performs angle demodulation of one of said angle-modulated signals which relates to said demodulation spread code;

a clock signal generating means for dividing an output of a voltage-controlled oscillator provided in said phase-locked loop circuit to generate a demodulation clock signal of said demodulation spread code;

a sync detection means for detecting sync condition on the basis of noise level of a phase detector provided in said phase-locked loop circuit, and generating a sync detection signal when sync condition is established;

a sync capture means for capturing a spread spectrum sync time in response to said sync detection signal; and a second angle demodulation means for performing angle demodulation of remainder of said angle-demodulated signals.

18. A spread spectrum communication system comprising a transmitter and a receiver: said transmitter including:

an angle modulation means for performing angle modulation of intelligence signals;

a frequency divider for receiving an angle-modulated signal outputted from said angle modulation means and dividing the frequency of this angle-modulated signal by a first dividing member to generate a modulation clock signal;

a spread code generating means for producing a spread code on the basis of said modulation clock signal; and a spread spectrum modulation means for modulating said angle-modulated signal by said spread code to output a spread spectrum modulation signal, said receiver including:

a despreading means for receiving said spread spectrum modulation signal and despreading it by a demodulation spread code;

an angle demodulation means for generating a demodulation output by means of a phase-locked loop circuit contained therein, which performs angle demodulation of a despreading signal outputted from said despreading means;

a sync detection means for detecting sync condition on the basis of noise level of a phase detector provided in said phase-locked loop circuit, and generating a sync detection signal when sync condition is established; and a clock signal generating means for responding said sync detection signal to switch a demodulation clock signal of said demodulation spread code between a temporary clock used for capturing a sync time and a regular clock which is equivalent to said modulation clock signal used in said transmitter.

* * * * *